US012674975B2

(12) United States Patent　　　　(10) Patent No.: US 12,674,975 B2

Shinkawa et al.　　　　　　　　　(45) Date of Patent: Jul. 7, 2026

(54) MOVABLE DEVICE, OPTICAL SCANNING SYSTEM, HEAD-UP DISPLAY, LASER HEADLAMP, HEAD-MOUNTED DISPLAY, OBJECT RECOGNITION APPARATUS, MOBILE OBJECT, AND POSITION DETECTION APPARATUS

(71) Applicants: Mizuki Shinkawa, Kanagawa (JP);
Daiki Minegishi, Miyagi (JP)

(72) Inventors: Mizuki Shinkawa, Kanagawa (JP);
Daiki Minegishi, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 320 days.

(21) Appl. No.: 18/518,783

(22) Filed: Nov. 24, 2023

(65) Prior Publication Data

US 2024/0176132 A1　　May 30, 2024

(30) Foreign Application Priority Data

Nov. 29, 2022　(JP) ................................. 2022-189818
Oct. 20, 2023　(JP) ................................. 2023-181397

(51) Int. Cl.
*G02B 26/10*　　(2006.01)
*F21S 41/675*　　(2018.01)
*G02B 26/08*　　(2006.01)
*G02B 27/01*　　(2006.01)

(52) U.S. Cl.
CPC .......... *G02B 26/101* (2013.01); *F21S 41/675* (2018.01); *G02B 26/0816* (2013.01); *G02B 27/0101* (2013.01)

(58) Field of Classification Search
CPC .............. G02B 26/101; G02B 26/0816; G02B 27/0101; F21S 41/675
See application file for complete search history.

(56) References Cited

U.S. PATENT DOCUMENTS

| | | | |
|---|---|---|---|
| 2016/0238283 A1* | 8/2016 | Hilger | F24S 50/20 |
| 2018/0088329 A1* | 3/2018 | Kojima | G02B 27/0172 |
| 2018/0282147 A1 | 10/2018 | Shinkawa et al. | |
| 2019/0391394 A1 | 12/2019 | Shinkawa et al. | |
| 2020/0290458 A1* | 9/2020 | Sunaga | G09G 5/10 |
| 2021/0041687 A1 | 2/2021 | Yokota et al. | |
| 2021/0157129 A1 | 5/2021 | Yoda et al. | |
| 2021/0286167 A1 | 9/2021 | Shinkawa | |
| 2022/0299757 A1 | 9/2022 | Shinkawa et al. | |
| 2022/0326512 A1 | 10/2022 | Shinkawa | |

FOREIGN PATENT DOCUMENTS

| | | |
|---|---|---|
| JP | 2016-110008 A | 6/2016 |
| JP | 2020-204695 A | 12/2020 |

OTHER PUBLICATIONS

U.S. Appl. No. 18/122,152, filed Mar. 16, 2023.
Extended European search report for EP23212302.6 mailed on May 3, 2024.

* cited by examiner

*Primary Examiner* — Lucy P Chien
(74) *Attorney, Agent, or Firm* — IPUSA, PLLC

(57) ABSTRACT

A movable device includes a movable portion; a driver connected to the movable portion, the driver to drive the movable portion; a reflector having a reflecting surface to reflect light; a connector connecting the movable portion and the reflector in a connection direction intersecting the reflecting surface; and a reinforcement. The reinforcement has at least one of: an extension portion from the reflector toward the movable portion, or another extension portion from the movable portion toward the reflector.

20 Claims, 32 Drawing Sheets

MOVABLE DEVICE, OPTICAL SCANNING SYSTEM, HEAD-UP DISPLAY, LASER HEADLAMP, HEAD-MOUNTED DISPLAY, OBJECT RECOGNITION APPARATUS, MOBILE OBJECT, AND POSITION DETECTION APPARATUS

CROSS-REFERENCE TO RELATED APPLICATIONS

This patent application is based on and claims priority pursuant to 35 U.S.C. § 119(a) to Japanese Patent Application No. 2022-189818, filed on Nov. 29, 2022 and Japanese Patent Application No. 2023-181397, filed on Oct. 20, 2023, in the Japan Patent Office, the entire disclosures of which are hereby incorporated by reference herein.

BACKGROUND

Related Art

Embodiments of the present disclosure relate to a movable device, an optical scanning system, a head-up display, a laser headlamp, a head-mounted display, an object recognition apparatus, a mobile object, and a position detection apparatus.

Related Art

A biaxial optical deflector is known in the art, in which the mirror driving portion is formed by processing the first wafer, and the mirror portion is formed by processing the second wafer. Further, in the biaxial optical deflector, the pillar portion on the mirror portion and the mirror support on the back surface of the mirror driving portion are bonded together.

SUMMARY

An embodiment of the present disclosure provides a movable device includes a support; a movable portion inside the support and connected to the support; a driver, on a face of the support, to drive the movable portion; a reflector having a reflecting surface to reflect light; a connector connecting the movable portion and the reflector in a connection direction intersecting the face of the support portion; and a reinforcement. The reinforcement has at least one of: an extension portion from the reflector toward the movable portion, or another extension portion from the movable portion toward the reflector.

An embodiment of the present disclosure provides a movable device includes a support; a movable portion inside the support and connected to the support; a driver, on a face of the support, to drive the movable portion; a reflector having a reflecting surface to reflect light; a connector connecting the movable portion and the reflector in a connection direction intersecting the face of the support portion; and a reinforcement. The reinforcement has at least one of: an extension portion from the reflector toward the movable portion, or another extension portion from the movable portion toward the reflector.

An embodiment of the present disclosure provides an optical scanning system including the movable device described above.

An embodiment of the present disclosure provides a head-mounted display including the movable device described above.

An embodiment of the present disclosure provides a head-up display including the movable device described above.

An embodiment of the present disclosure provides a laser headlamp including the movable device described above.

An embodiment of the present disclosure provides an object recognition apparatus including the movable device described above to recognize an object.

An embodiment of the present disclosure provides a mobile object including at least one of: the head-up display; the laser headlamp; or the object recognition apparatus.

An embodiment of the present disclosure provides a position detection apparatus including the movable device described above to detect a position of pupil or cornea.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 2 is a cross-sectional view of the movable device in FIG. 1, according to an embodiment of the present disclosure;

FIG. 10 is a cross-sectional view of a movable device according to a first modification of an embodiment of the present disclosure;

FIG. 15 is an A-A' cross-sectional view of the movable device in FIG. 14;

FIG. 31 is a schematic diagram of the LiDAR device in FIG. 30, according to an embodiment of the present disclosure;

Figure 1:
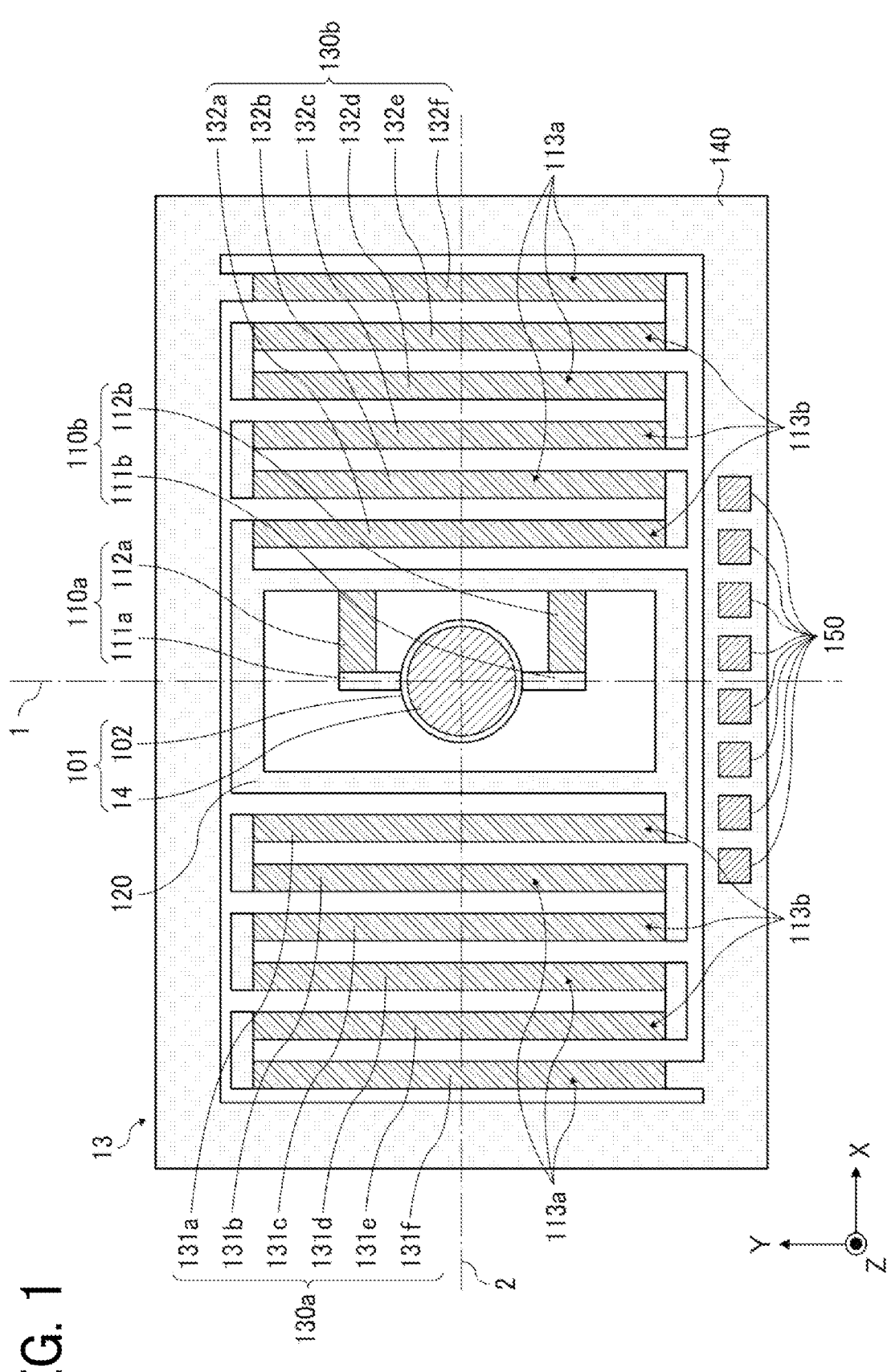
FIG. 1 is a plan view of a movable device according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a," "an," and "the" are intended to include the plural forms as well, unless the context clearly indicates otherwise.

According to one aspect of the present disclosure, a movable device with a robust connector can be achieved.

Embodiments of the present disclosure are described below with reference to the drawings. Like reference signs are applied to identical or corresponding components throughout the description of the drawings and redundant description thereof is omitted.

Configuration of Movable Device

FIG. 1 is a plan view of a movable device 13 according to an embodiment of the present disclosure. As illustrated in FIG. 1, the movable device 13 includes a mirror portion 101, a first driver 110a, a second driver 110b, a first support portion 120, a third driver 130a, a fourth driver 130b, a second support portion 140, and electrode connection parts 150. The mirror portion 101 reflects incident light. The first driver 110a and the second driver 110b are connected to the reflector 101 and drive the mirror portion 101 about a first axis that is parallel to the Y-axis. The first support portion 120 supports the mirror portion 101 and the first driver 110a. The third driver 130a and the fourth driver 130b are connected to the first support portion 120 and drive the mirror portion 101 and the first support portion 120 around a second axis that is parallel to the X-axis. The second support portion 140 supports the third driver 130a and the fourth driver 130b. The electrode connection parts 150 are electrically connected to the first to fourth drivers, and a control device 11. The first axis intersects the second axis. The first to fourth drivers 110a to 110d are referred to collectively as a driving section.

The movable device 13 is formed of one silicon on insulator (SOI) substrate that is formed by any appropriate treatment method, such as etching. On the formed SOI substrate, for example, the reflecting surface 14, a first drive portion 112a, a second drive portion 112b, third drive portions 131a to 131f, fourth drive portions 132a to 132f, and the electrode connection parts 150 are formed, which constitute an integral structure of the above-described components. The above-described components may be formed after the SOI substrate is molded, or may be formed during the formation of the SOI substrate.

Figure 2:
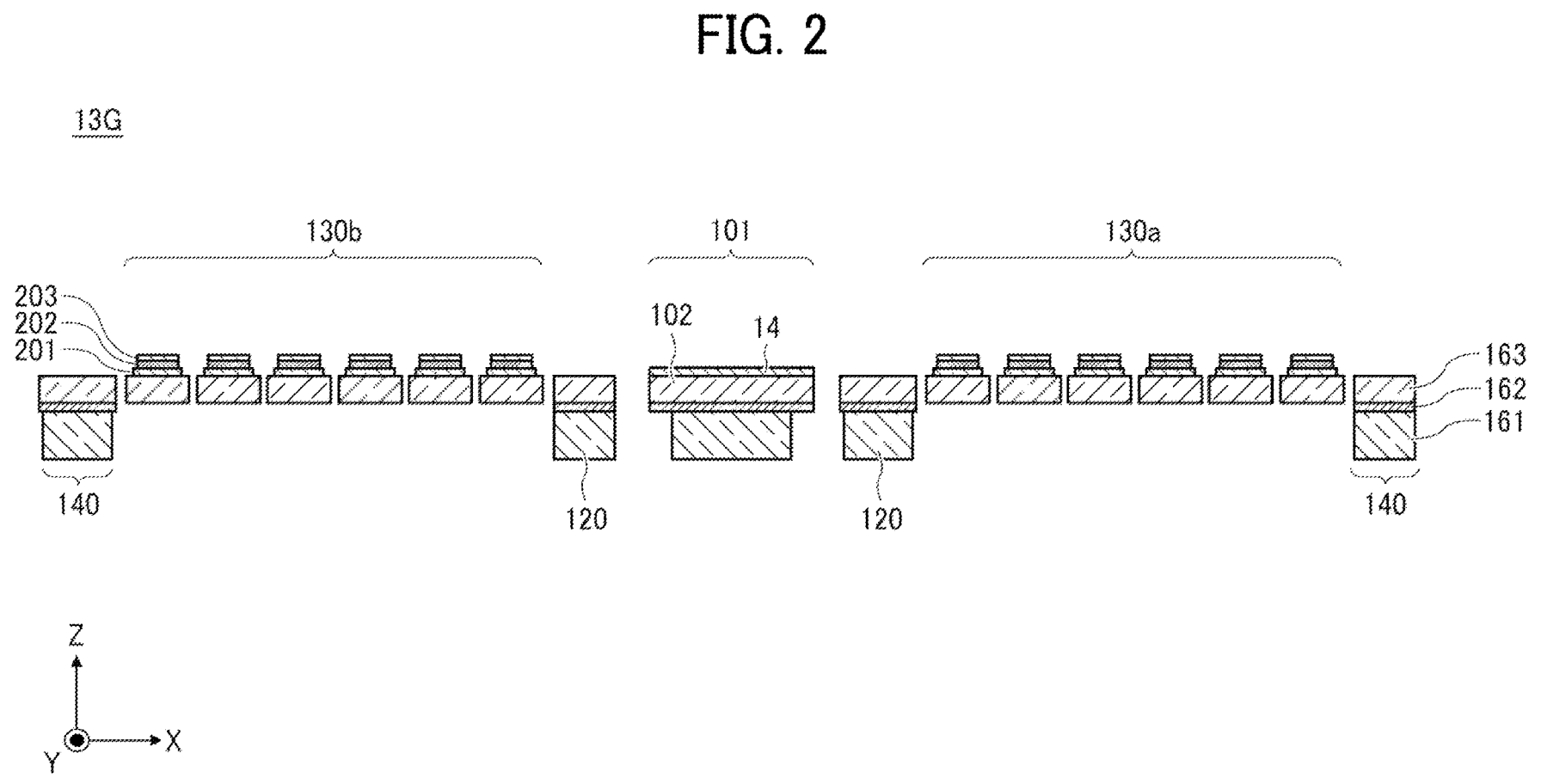

FIG. 2 is a cross-sectional view of the movable device in FIG. 1, according to an embodiment of the present disclosure. The SOI substrate includes a first silicon layer formed of single-crystal silicon (Si), on which a silicon oxide layer 162 is provided. On top of the silicon oxide layer 162, a second silicon layer formed of single crystal silicon is further provided. In the following description, the first silicon layer is referred to as a silicon supporting layer 161, and the second silicon layer is referred to as a silicon active layer 163.

The silicon active layer 163, having a smaller thickness in the Z-axis direction than in the X-axis direction or Y-axis direction, functions as an elastic part with elasticity when the drivers are formed only of the silicon active layer 163.

In some embodiments, the SOI substrate has, for example, a curvature. In other words, the SOI substrate may not be planar. The drivers used for forming the movable device 13 are not limited to the SOI substrate, as long as the substrate can be integrally formed through, for example, etching and can be made partially elastic.

The mirror portion 101 includes, for example, a circular-shaped mirror-portion base 102 and the reflecting surface 14 formed on the +Z-side surface of the mirror-portion base 102. The mirror-portion base 102 includes, for example, the silicon active layer 163. The reflecting surface 14 includes a thin metal film containing, for example, aluminum (Al), gold (Au), and silver (Ag). The mirror portion 101 may include a rib for strengthening the mirror portion on the −Z-side face of the mirror-portion base 102. For example, the rib includes the silicon support layer 161 and the silicon oxide layer 162. The rib serves to prevent or minimize distortion of the reflecting surface 14 that may occur due to its movement.

The first driver 110a and the second driver 110b are connected at one end to the mirror-portion base 102, and connected at the other end to the first support portion 120. The first driver 110a includes a first connecting portion (i.e., a torsion bar 111a), the first drive portion 112a, and a support body for the first drive portion 112a. Two torsion bars 111a and 111b support the mirror portion 101 while enabling its movement and extending in the first-axis direction. The torsion bars 111a and 111b are connected to the support bodies of the first drive portion 112a and the second drive portion 112b, respectively. The support bodies of the drivers are connected to the first support portion 120.

As illustrated in FIG. 2, the torsion bars 111a and 111b include the silicon active layer 163. The first drive portion 112a and the second drive portion 112b each include a lower electrode 201, a piezoelectric portion 202, and an upper electrode 203, which are sequentially formed on the +Z-side surface of the silicon active layer 163 serving as an elastic portion. For example, both the upper electrode 203 and the lower electrode 201 contain materials such as Au or platinum (Pt). The piezoelectric portion 202 is a piezoelectric material such as lead zirconate titanate (PZT).

Referring back to FIG. 1, the first support portion 120 is, for example, a rectangular support body that is formed to surround the mirror portion 101. The first support portion 120 includes the silicon support layer 161, the silicon oxide layer 162, and the silicon active layer 163.

The third driver 130a includes the third drive portions 131a to 131f, which are connected in a folded or zigzag matter to form a meander structure. The fourth driver 130b includes the fourth drive portions 132a to 132f, which are connected in a folded or zigzag matter to form a meander structure. One end of the third driver 130a is connected to the outer periphery of the first support portion 120. The other end of the third driver 130a is connected to the inner periphery of the second support portion 140. One end of the fourth driver 130b is connected to the outer periphery of the first support portion 120. The other end of the fourth driver 130b is connected to the inner periphery of the second support portion 140. In this arrangement, a connection point between the support body of the third driver 130a and the first support portion 120 and a connection point between the support body of the fourth driver 130b and the first support portion 120 are point-symmetric with respect to the center of the reflecting surface 14. Similarly, a connection point between the support body of the third driver 130a and the second support portion 140 and a connection point between the support body of the fourth driver 130b and the second support portion 140 are also point-symmetric with respect to the center of the reflecting surface 14.

On the Z-side faces of the third drive portions 131a to 131f and the fourth drive portions 132a to 132f, piezoelectric-driver groups A 113a and piezoelectric-driver groups B 113b are alternately provided for the drivers. In this configuration, driving only the piezoelectric-driver groups A 113a or piezoelectric-driver groups B 113b allows for control of the deflection angle of the mirror portion in a positive or negative direction. This is achieved without using negative voltage. Out-of-phase voltages are applied to the piezoelectric-driver groups A 113a and the piezoelectric-driver groups B 113b for switching the applied voltage signals in the time domain. During this process, a time delay is intentionally introduced between the signal switches of the piezoelectric-driver groups A 113a and the piezoelectric-driver groups B 113b. This results in mechanical vibrations that are out of phase between the piezoelectric-driver groups A 113a and the piezoelectric-driver groups B 113b, effectively canceling each other out. This enables high-speed drawing and responsiveness to complex driving waveforms.

As illustrated in FIG. 2, the third driver 130a and the fourth driver 130b each include the lower electrode 201, the piezoelectric portion 202, and the upper electrode 203, which are sequentially formed on the +Z-side surface of the silicon active layer 163 serving as an elastic portion. For example, both the upper electrode 203 and the lower electrode 201 contain materials such as Au or platinum (Pt). The piezoelectric portion 202 is a piezoelectric material such as lead zirconate titanate (PZT).

Referring back to FIG. 1, the second support portion 140 includes the silicon support layer 161, the silicon oxide layer 162, and the silicon active layer 163. The second support portion 140 is a rectangular support body that is formed to surround the mirror portion 101, the first driver 110a, the second driver 110b, the first support portion 120, the third driver 130a, and the fourth driver 130b.

The electrode connection parts 150 are, for example, formed on the +Z-side surface of the second support portion 140. The electrode connection parts are electrically connected to the upper electrodes 203 and the lower electrodes 201 of the first drive portion 112a, the second drive portion 112b, the third drive portions 131a to 131f, the fourth drive portions 132a to 132f, and the control device 11 via electrode wiring of, for example, aluminum (Al). The upper electrode 203 and the lower electrode 201 may be directly connected to the electrode connection parts or may be indirectly connected to the electrode connection part by, for example, connecting the electrodes to each other.

In at least one embodiment of the present disclosure, the piezoelectric portion 202 is located only over one side (i.e., the +Z-side surface) of the silicon active layer 163 that is the elastic portion as illustrated in FIG. 2. In some embodiments, the piezoelectric portion 202 is located over the other side (i.e., the −Z-side surface) of the elastic portion. In some other embodiments, the piezoelectric portion 202 is located over each side of the elastic portion.

The shapes of the components described above are not limited to those described in embodiments of the present disclosure as long as the mirror portion 101 can be driven about the first axis or the second axis. For example, the torsion bars 111a and 111b, the first drive portion 112a, and the second drive portion 112b may have a shape with curvature. In some embodiments, each of the torsion bars 111a and 111b includes multiple elements.

Further, an insulating layer, which includes a silicon oxide layer, may be formed on at least one of the following surfaces: the +Z-side surfaces of the upper electrodes 203 of the first driver 110a and the second driver 110b, the +Z-side surface of the first support portion 120, the +Z-side surfaces of the upper electrodes 203 of the third driver 130a and the fourth driver 130b, and the +Z-side surface of the second support portion 140. In this configuration, electrode wiring is laid out on the insulating layer. Additionally, the insulating layer is partially removed or not formed at specific connection spots where the upper electrode 203 or the lower electrode 201 connects with the electrode wiring, creating openings. This approach enhances the design flexibility of the first driver 110a, the second driver 110b, the third driver 130a, and the fourth driver 130b, and also significantly reduces the risk of short circuits due to contact between the electrodes. The silicon oxide film also has a function as an anti-reflection material.

Control Details of Control Device

The control details for the control device that drives the first to fourth drive units of the movable device are described in detail below.

The piezoelectric portions 202, included in the first driver 110a, the second driver 110b, the third driver 130a, and the fourth driver 130b, exhibit inverse piezoelectric effects. When a voltage, either positive or negative, is applied in the direction of polarization, the piezoelectric portion 202 undergoes a deformation (e.g., expansion or contraction) proportional to the potential of the applied voltage. The first driver 110a, the second driver 110b, the third driver 130a, and the fourth driver 130b utilize the inverse piezoelectric effect described above to move the mirror portion 101.

When the reflecting surface 14 of the mirror portion 101 tilts toward the +Z-direction or −Z-direction relative to the XY plane, the angle formed by the reflecting surface 14 and the XY plane is referred to as the deflection angle. Its tilt in the +Z-direction is a positive deflection angle, and its tilt in the −Z-direction is a negative deflection angle.

The control of the control device that drives the first drive unit is initially described. In the first driver 110a and the second driver 110b, when a drive voltage is applied in parallel with the piezoelectric portions 202 of the first drive portion 112a and the second drive portion 112b through the upper electrodes 203 and the lower electrodes 201, the piezoelectric portions 202 undergo deformation. Due to the action caused by the deformation of the piezoelectric portions 202, both the first drive portion 112a and the second drive portion 112b undergo bending deformation. As a result, through the twisting of the two torsion bars 111a and 111b (i.e., connection portions), a driving force around the first axis is applied to the mirror portion 101, causing the mirror portion 101 to rotate about the first axis. The drive voltage applied to the first driver 110a and the second driver 110b is controlled by the control device 11.

The control device 11 applies predetermined sinusoidal drive voltages in parallel to the first drive portion 112a and the second drive portion 112b of the first driver 110a and the second driver 110b, respectively, enabling a sinusoidal movement of the mirror portion 101 about the first axis at the period of the predetermined sinusoidal drive voltage.

For example, when the frequency of the sinusoidal-waveform voltage is set to approximately 20 kilohertz (kHz), which is substantially equivalent to the resonant frequency of the torsion bars 111a and 111b, the mirror portion 101 can be resonated at about 20 kHz, using the mechanical resonance induced by the torsion of the torsion bars 111a and 111b.

Figure 3:
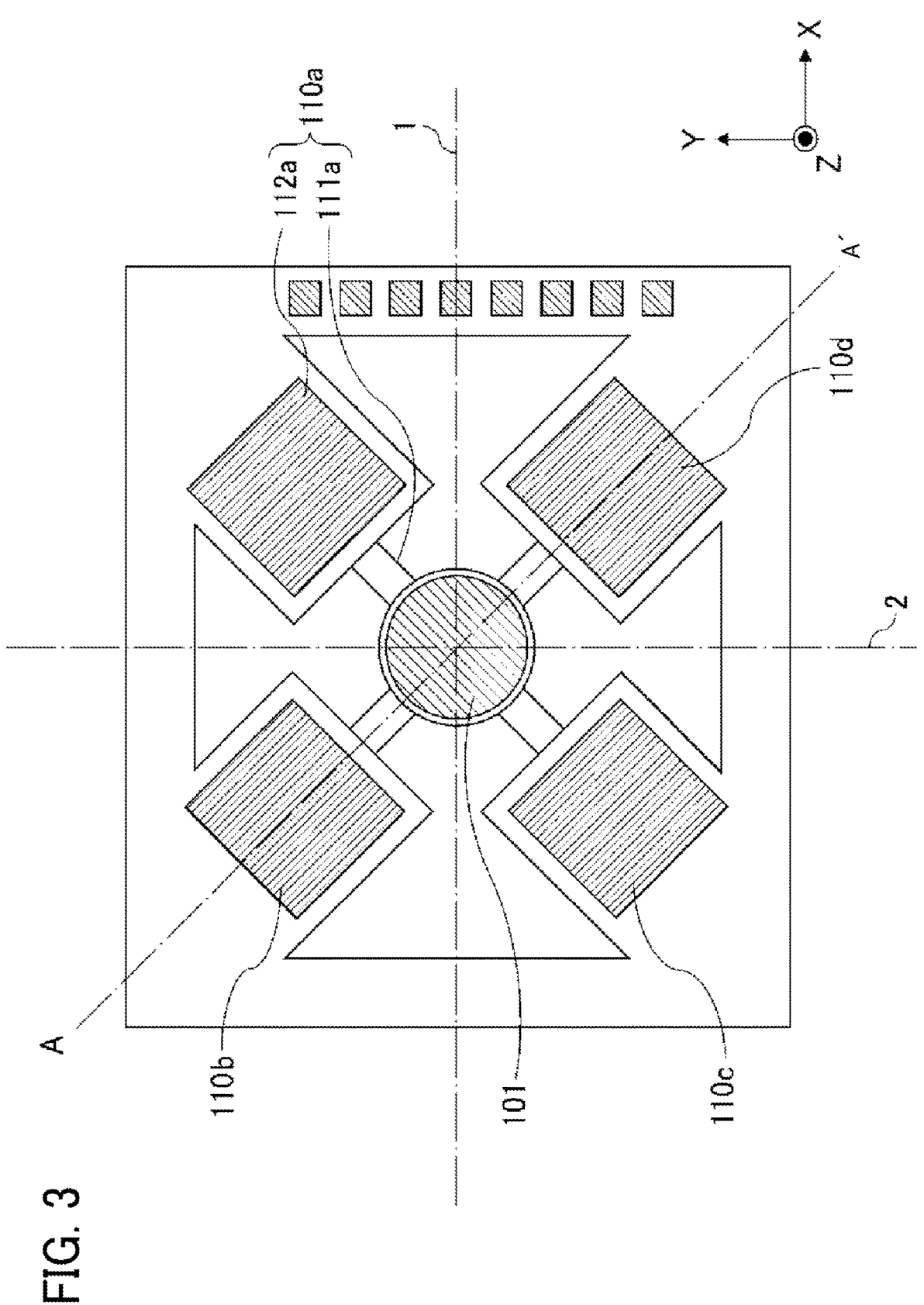
FIG. 3 is a plan view of a movable device according to a first comparative example.

FIG. 3 is a plan view of a movable device according to a first comparative example. The first to fourth drive units are positioned differently in relation to the mirror portion 101. The first to fourth drivers 110a to 110d include first to fourth drive portions 112a to 112d, first to fourth torsion bars 111a to 111d, and support bodies connected to the first support portion 120, respectively.

Figure 4:
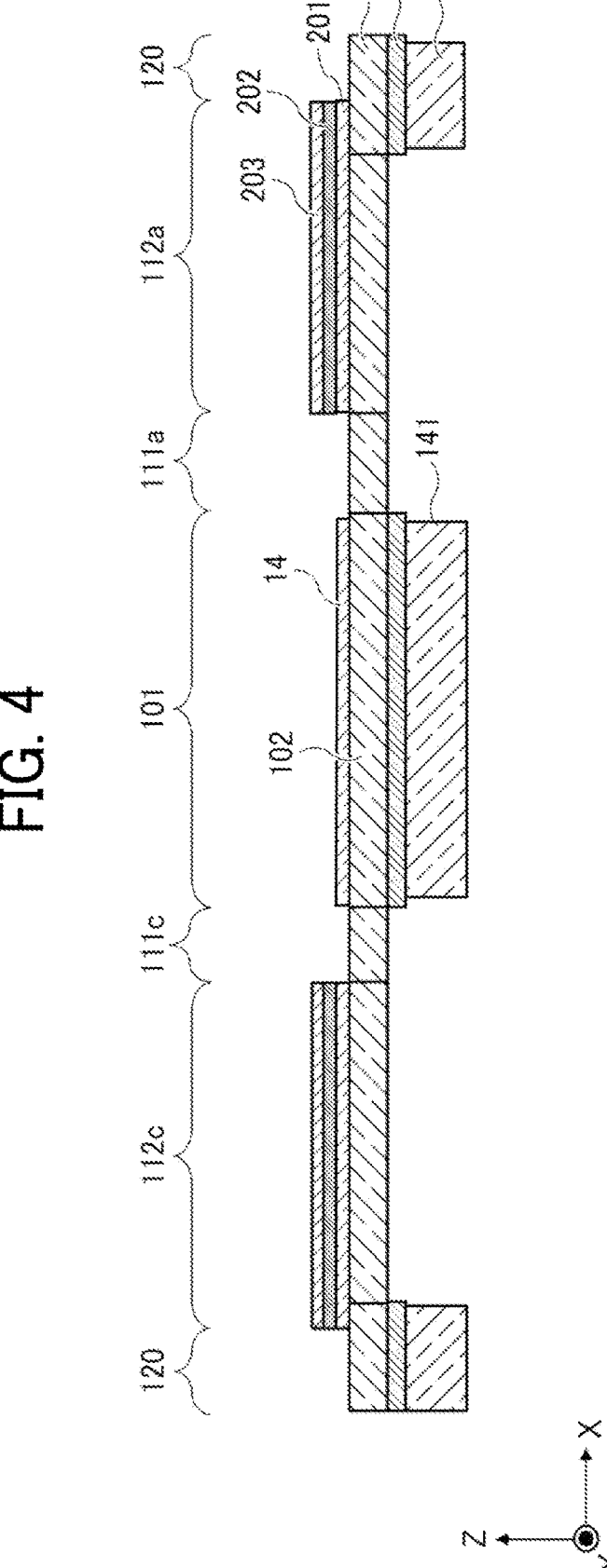
FIG. 4 is an A-A' sectional view of the movable device in FIG. 3.

FIG. 4 is an A-A' cross-sectional view of the movable device in FIG. 3, according to the first comparative example. The reflecting surface 14, which is formed on the surface of the mirror-portion base 102, rotates in response to the driving of the second drive portion 112b and the fourth drive portion 112d. The mirror portion 101 has increased mechanical strength through the ribs 141. The rib 141 is formed by the silicon support layer 161.

Figure 5:
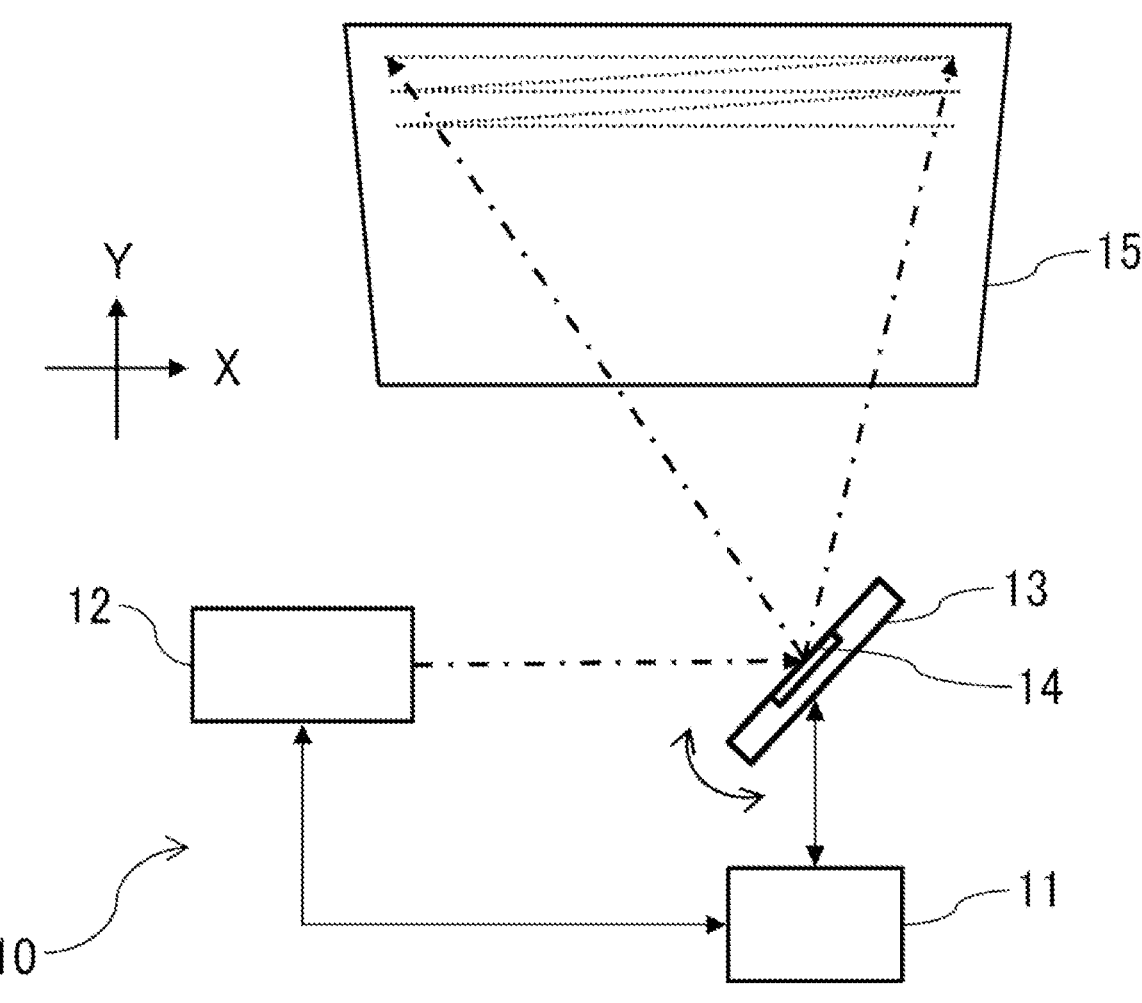
FIG. 5 is a diagram of raster scanning according to an embodiment of the present disclosure.
Figure 6:
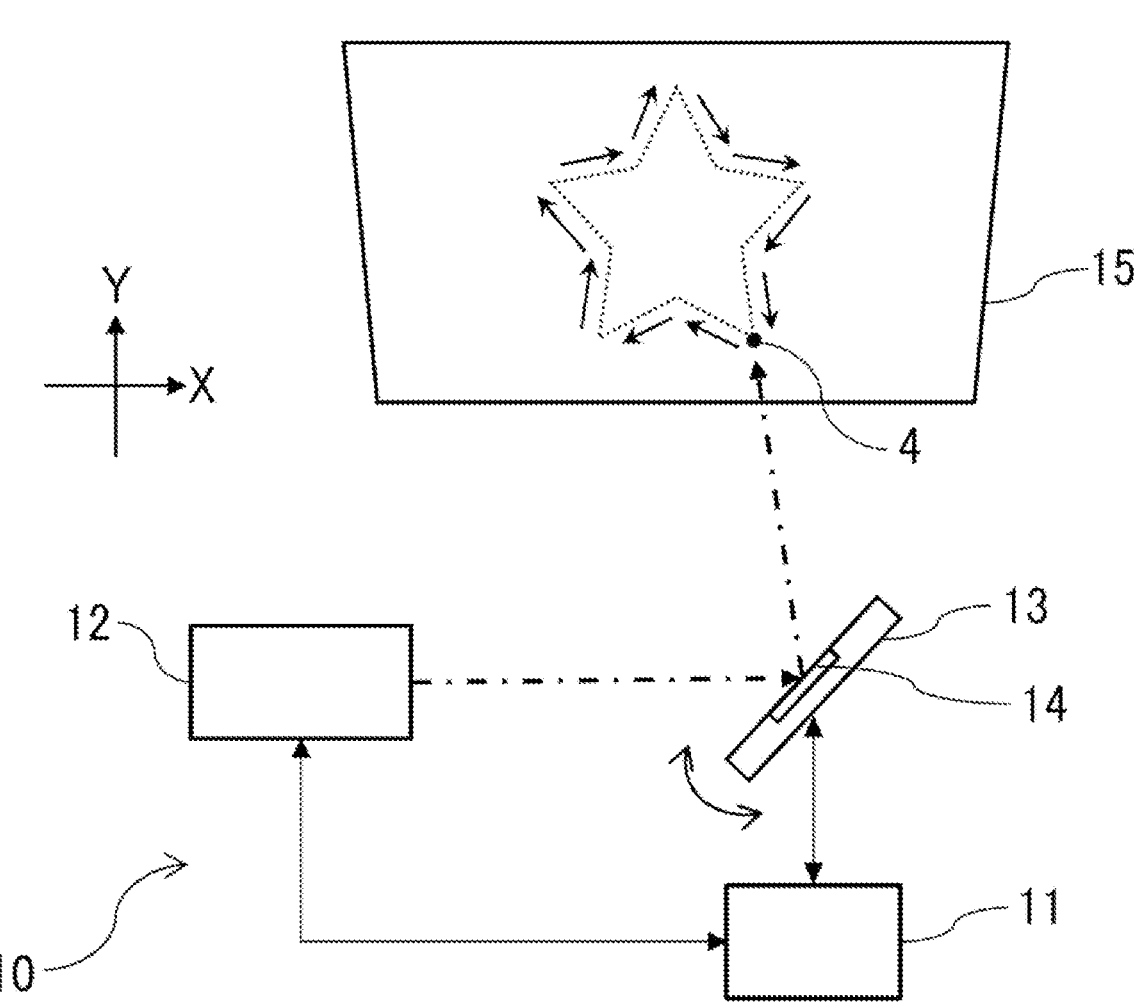
FIG. 6 is a diagram of vector scanning according to an embodiment of the present disclosure.

As illustrated in FIG. 3, the mirror portion 101 is supported at four positions, and driving the elements at the positions enables a movable device that two-dimensionally deflects light. FIG. 1 illustrates a movable device suitable for raster scanning, whereas FIG. 3 illustrates a movable device suitable for vector scanning or Lissajous scanning. Raster scanning, as illustrated in FIG. 5, is suitable for uniformly displaying, for example, images on a screen as illustrated in FIG. 5. Vector scanning as illustrated in FIG. 6 is suitable for efficiently displaying, for example, a figure by scanning in a short time. In particular, as illustrated in FIG. 6, vector scanning is extremely efficient when displaying, for example, figures with a single continuous line from a starting point to an endpoint.

The material, manufacturing process, electrical connection, and control method can be the same as those described in FIG. 1, though these are not limited to the above connection and control method. The method for driving the drivers is not limited to piezoelectric driving. Alternatively, the actuator is driven by an electrostatic drive, electromagnetic drive, or thermoelectric drive. The shapes of the components described above are not limited to those described in the above embodiments.

Figure 7:
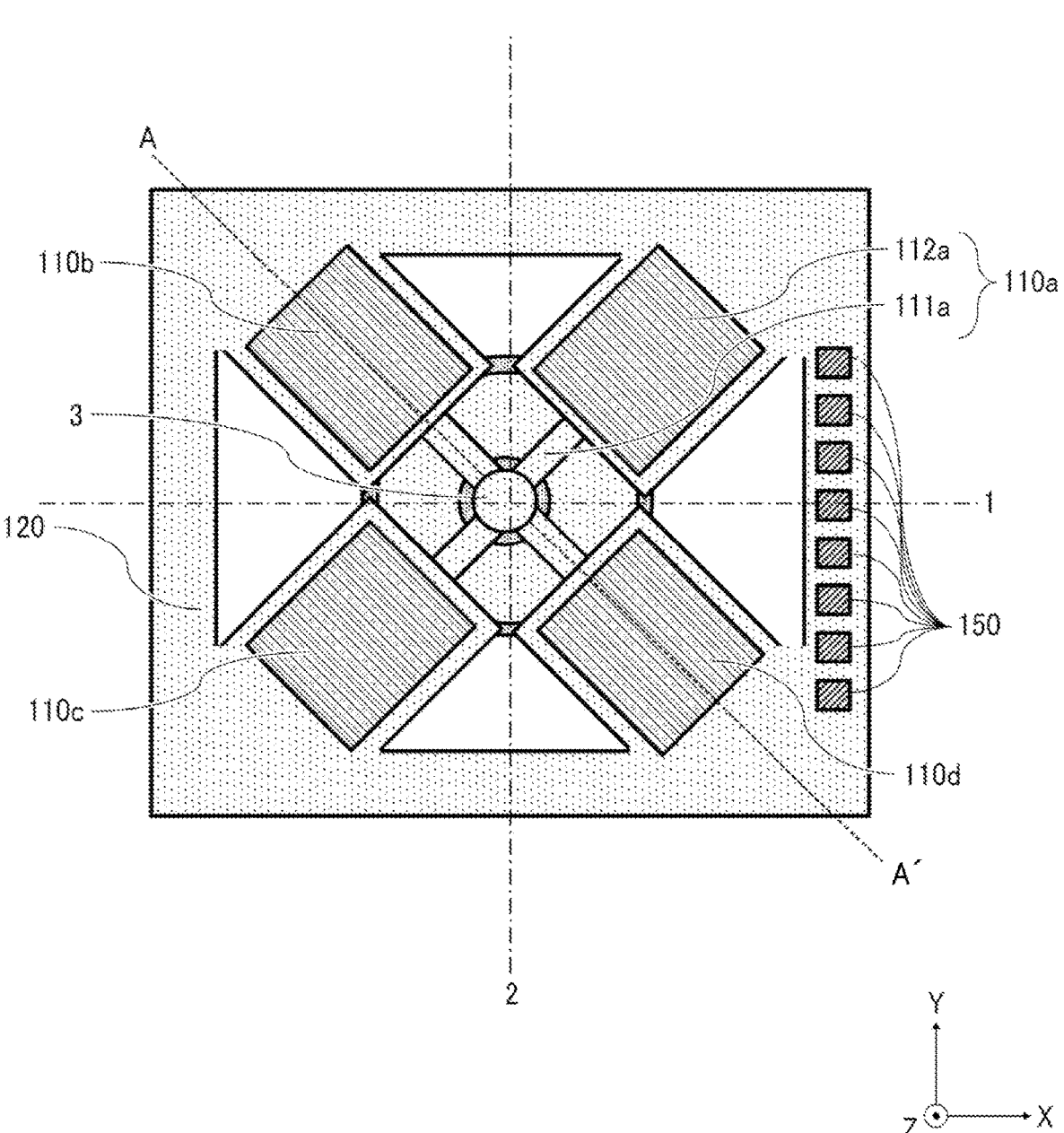
FIG. 7 is a plan view of a movable device according to an embodiment of the present disclosure.

FIG. 7 is a diagram of a movable device according to an embodiment of the present disclosure. Arrows illustrated in FIG. 7 indicate the X-direction, the Y-direction, and the Z-direction, respectively. The directions described in the A-A' sectional view (e.g., in FIG. 8) to be described later correspond to the directions illustrated in FIG. 7. The movable device according to an embodiment of the present disclosure includes a movable portion 3, first to fourth drivers 110a to 110d, a first support portion 120 (i.e., a support), and electrode connection parts 150. The first to fourth drivers 110a to 110d include first to fourth drive portions 112a to 112d and torsion bars 111a to 111d, respectively. The movable portion 3 is located substantially at the center of the first to fourth drivers 110a to 110d and is supported at four points by the torsion bars 111a to 111d. The first to fourth drive portions 112a to 112d of the movable portion 3 two-dimensionally rotate the movable portion 3 through both positive and negative angles (i.e., across positive and negative angles). The end face of the movable portion 3, which is not connected to the first to fourth drivers 110a to 110d, is connected to the mirror portion 101. This allows the movable portion 3 to two-dimensionally rotate the mirror portion 101. The mirror portion 101 serves as a reflector.

Figure 8:
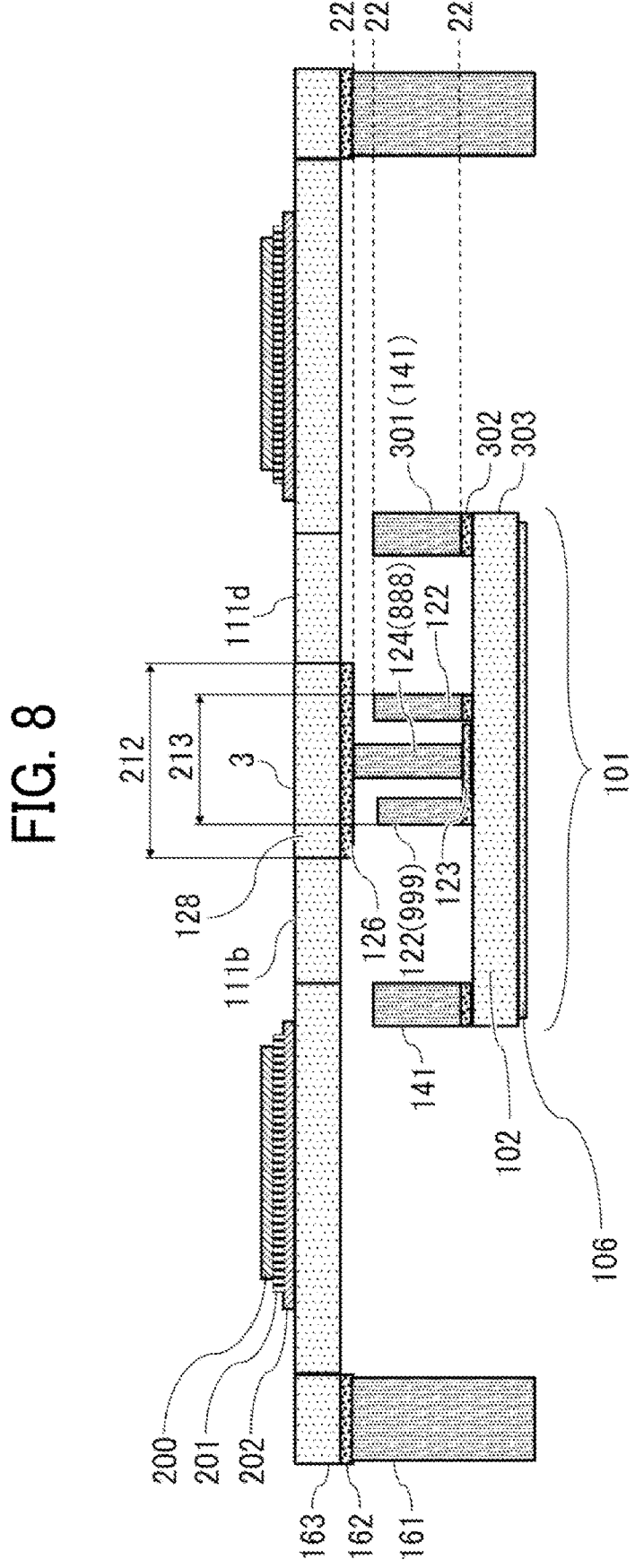
FIG. 8 is an A-A' cross-sectional view of the movable device in FIG. 7, according to an embodiment of the present disclosure.

FIG. 8 is an A-A' cross-sectional view of the movable device in FIG. 7 according to an embodiment of the present disclosure. As illustrated in FIG. 8, the movable portion 3 and the mirror portion 101 are connected to each other via the support layer 124. The mirror portion 101 is provided with a pillar 122 and a rib 141.

The movable portion 3 includes two layers: a silicon active layer 128 and a silicon oxide layer 126. These layers are formed from a first SOI substrate, for example, along with the silicon active layer 163 and the silicon oxide layer 162.

The support layer 124 is connected to the movable portion 3 via a first joint portion 123 and the silicon oxide layer 126. The silicon oxide layer 126 is referred to also as a second joint portion. In other words, the support layer 124 according to an embodiment of the present disclosure serves as a connector 888 that connects the movable portion 3 and the mirror portion 101 in a direction intersecting with a reflecting surface of the mirror portion 101 (i.e., in a direction intersecting with the first support portion 120, or the Z-direction). The support layer 124 is integrally formed in any shape by selective dry etching and protrudes downward (i.e., in the −Z direction) from the planar movable portion 3. The support layer 124 is formed from the first SOI substrate, for example, along with the silicon support layer 161.

The first joint portion 123 is, for example, an adhesive such as an adhesive resin. The first joint portion 123 has a larger diameter than the diameter of the support layer 124. This configuration allows the entire area of the joint surface of the support layer 124 to make firm contact with the first joint portion 123, achieving a more robust connection with the mirror portion 101.

The mirror portion 101 has a reflecting surface 106 formed on the lower surface of a mirror-portion base 102. The mirror-portion base 102 includes, for example, a silicon active layer 303, which is formed from a second SOI substrate that includes the silicon active layer 303, a silicon oxide layer 302, and a silicon support layer 301.

The pillar 122 is formed from the silicon support layer 301 of the second SOI substrate. The pillar 122 is referred to also as a protrusion. The pillar 122 is formed in a hollow cylindrical shape surrounding the support layer 124 in the vicinity of the support layer 124. The pillar 122 prevents the spread of the adhesive that serves as the first joint portion 123. In addition, the first joint portion 123 contacts at least a part of the inner wall of the pillar 122. This contact configuration allows for an increase in the contact area between the member formed by the second SOI substrate and the adhesive. This enables a stronger connection between the support layer 124 and the mirror portion 101. In this configuration, the pillar 122 according to an embodiment of the present disclosure serves as a reinforcement section 999 that reinforces the connection between the support layer 124 and the mirror portion 101.

The rib 141 is formed, for example, from the silicon support layer 301 of the second SOI substrate. The rib 141 is formed in a hollow cylindrical shape at the end of the mirror portion 101 to encircle, or surround the support layer 124.

The pillar 122 and the rib 141 are formed by the silicon support layer of the SOI substrate. The mirror-portion base 102 is a thin silicon active layer having a thickness of several ten microns, whereas the silicon support layer 301 has a thickness of several hundred microns. The silicon support layer 301 serves as a skeleton of the mirror-portion base 102. In this configuration, the rib 141 and the pillar 122 can be integrated to strengthen the structure of the mirror-portion base 102 The rib 141 is located particularly in the vicinity of the first joint portion 123 at which the stress of the mirror portion 101 is concentrated. This location allows the mirror-portion base 102 to be firmly joined with the pillar 122, efficiently enhancing the strength of the mirror-portion base 102. The silicon support layer 301 has a thickness of several hundred microns, achieving the height of the inner wall of the pillar 122.

The ribs 141 formed by the second SOI substrate enhance the strength of the mirror portion 101. In this configuration, the thin silicon active layer 303 forms the mirror-portion base 102, which occupies most of the mirror portion 101, achieving a reduction in weight. Furthermore, the mechanical strength of the mirror portion 101 is maintained by the function of the ribs 141. This configuration reduces the weight of the mirror portion 101 and also lowers the moment of inertia As a result, the mirror portion 101 can be oscillated more rapidly, and the maximum deflection angle of the mirror portion 101 for the same driving force can be increased.

The pillar 122 is formed by the second SOI substrate including the mirror-portion base 102.

The hollow-cylindrical pillar 122 has a diameter 213 smaller than a diameter 212 of the movable portion 3. The support layer 124 located inside the pillar 122 is also smaller than the movable portion 3 in a radial direction of the pillar 122. In this configuration, the movable portion 3 has a large diameter, achieving the torque of the movable portion 3. Further, the widths of the torsion bars 111b and 111d can be adjusted in accordance with the diameter 212 of the movable portion 3. This achieves both an increased mechanical strength and a higher maximum deflection angle of the mirror portion 101 for the same driving force. At the same time, with the pillar 122 being thin, a decreased moment of inertia is achieved. This achieves a movable device with an increased deflection range of the oscillation.

The relative height between the pillar 122 and the support layer 124 is described below. A reference position refers to the upper surface of the mirror-portion base 102, which is the upper surface of the silicon oxide layer 302 of the second SOI substrate in a direction perpendicular to the radial direction. The height of the pillar 122 is the distance between the reference position 222 and the upper surface 221 of the pillar 122 in the direction perpendicular to the radial direction. The height of the support layer 124 is the distance between the reference position 222 and the joint surface between the support layer 124 and the silicon oxide layer 126. The joint surface 220 between the support layer 124 and the silicon oxide layer 126 corresponds to the lower surface of the silicon oxide layer of the first SOI substrate in the direction perpendicular to the radial direction. The height of the support layer 124 does not include the thickness of the first joint portion 123. The support layer 124 is preferably higher than the pillar 122 in the direction perpendicular to the radial direction. Such a configuration allows the pillar 122 maintaining the strength of the mirror-portion base 102 to be a robust structure and also prevents any interference with the rotational movement of the support layer 124. This enables a smaller moment of inertia and an increased deflection range of the oscillation of the mirror portion 101.

For the same purpose as the pillars 122, the rib 141 is formed at the edge of the mirror-portion base 102 in the radial direction. The rib 141 is formed by the silicon support layer 301 of the second SOI substrate. Like the height of the pillar 122 as described above, the height of the rib 141 is also determined by the reference position 222 and the upper surface 221 of the pillar 122. The rib 141 is also designed to be lower than the support layer 124. This configuration prevents damage due to the contact of the rib 141 with, for example, the torsion bar 111b or 111d during the rotation of the mirror portion 101. The rib 141 enables the mirror-portion base 102 to be lightweight while providing a robust reflecting surface 106. Such a reduction in weight allows for a smaller moment of inertia.

Figure 9:
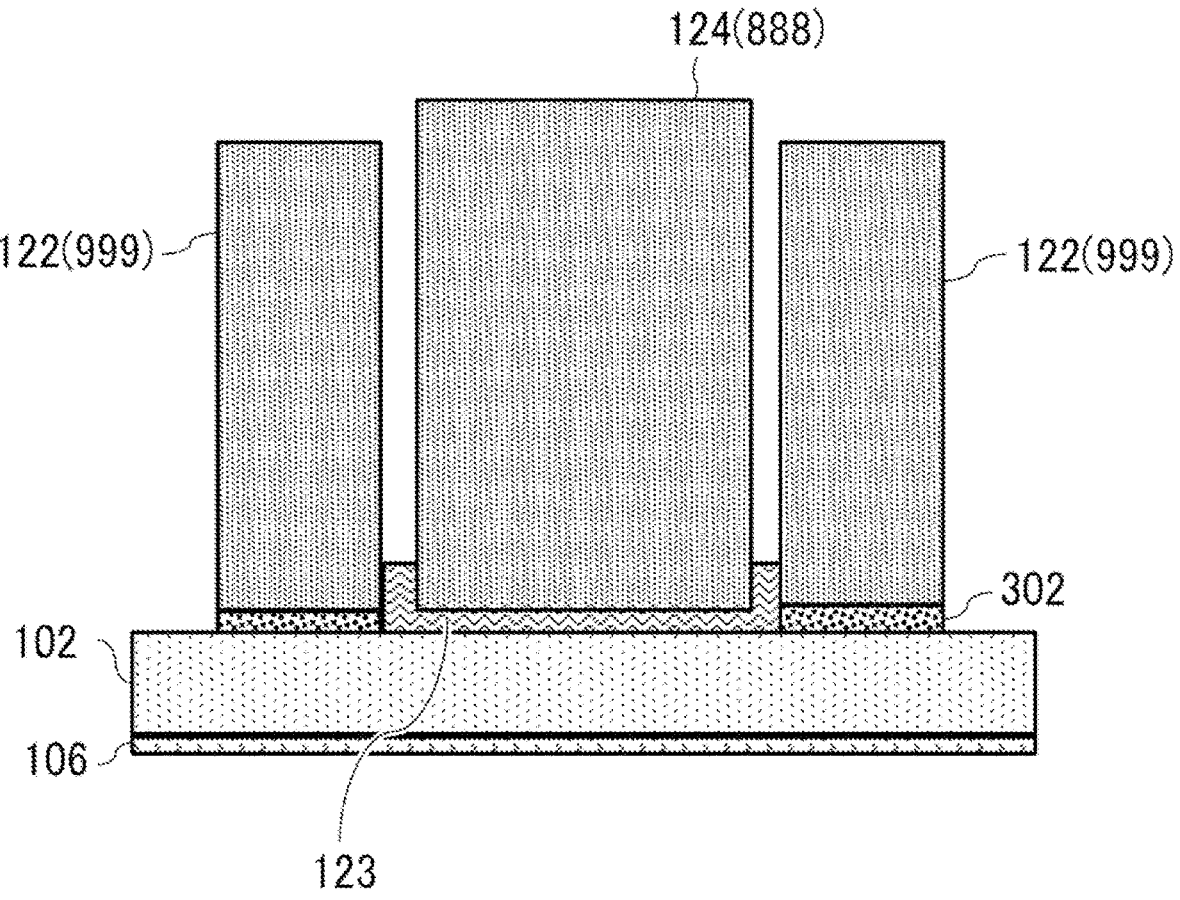
FIG. 9 is a cross-sectional view of a joint portion in the movable device in FIGS. 7 and 8, according to an embodiment of the present disclosure.

FIG. 9 is an enlarged cross-sectional view of the first joint portion 123 (i.e., adhesive resin) and its surrounding area. The first joint portion 123 includes an adhesive resin. The first joint portion 123 is referred to also as an adhesive resin. The pillar 122 according to an embodiment of the present disclosure is hollow cylindrical. The inner diameter of the pillar 122 exceeds the width of the support layer 124 in the radial direction of the pillar 122 by approximately several ten microns. In other words, a gap of several ten microns is provided between the support layer 124 and the pillar 122. The side wall of the support layer 124 and the inner wall of the pillar 122 face each other with the gap therebetween. The support layer 124 is fixed to the mirror-portion base 102 by the first joint portion 123, which is an elastic body. The pillar 122 is fixed to the mirror-portion base 102 through the silicon oxide layer 302, which has strong covalent bonds.

Forces acting on the support layer 124 and the pillar 122 in different directions may cause their relative movement. However, the configuration as described above can prevent or reduce such a relative movement, enhancing the long-term stability of the joint portion. With the side wall of the support layer 124 and the inner wall of the pillar 122 properly facing each other, the pillar 122 facing the support layer 124 restricts further movement of the support layer 124 irrespective of any initial motion. A joint with strong mechanical strength can be achieved by forming such a face-to-face arrangement optimally. This allows the support layer 124 connected to the first to fourth drivers 110a to 110d to be firmly fixed to the mirror-portion base 102.

Any appropriately designed gap between the support layer 124 and the pillar 122 allows for clearance during the mounting of the mirror portion 101. This gap is preferably at least 1 micron or greater in view of the performance of a die bonder for mounting the mirror portion 101. This depends on the diffraction limit of a stereomicroscope having a deep focal depth incorporated in the die bonder.

The first joint portion 123 is pressed from above by the end face (or lower surface) of the support layer 124, resulting in its deformation and followed by a curing process using, for example, heat. The first joint portion 123 between the support layer 124 and the mirror-portion base 102 preferably has a thickness of 10 nanometers or greater. The adhesive resin is an elastic body, which absorbs external impacts and prevents, for example, interfacial peeling. However, the adhesive resin with a thickness of 10 nanometers or less can no longer undergo sufficient elastic deformation to absorb such impacts.

The lower surface of the support layer 124 is bonded, or joined to the mirror-portion base 102 by the first joint portion 123. The first joint portion 123 is preferably made of a thermosetting resin, and may be made of a typical adhesive such as an epoxy resin or a silicone resin. The tensile modulus of the first joint portion 123 is preferably 20 Newton (N)/millimeter (mm)^2 or less. This absorbs external impacts, such as vibrations, and reduces peeling at the interface, achieving the long-term stability of the joint portion.

The first joint portion 123 is pressed from above by the end face (or lower surface) of the support layer 124, resulting in its deformation. The first joint portion 123 is then cured with heat while remaining deformed. Due to its high wettability, the support layer 124 causes the deformed first joint portion 123 to climb up along the side face of the support layer 124. The first joint portion 123 is cured while contacting both the side surface of the support layer 124 and the inner wall of the pillar 122. This allows the support layer 124 to be fixed to the inner wall of the pillar 122. The side surface of the support layer 124 extends in the Z-direction (i.e., the direction perpendicular to the radial direction of the pillar 122 as described above) and serves as a surface extending perpendicularly to the joint surface 220.

The first joint portion 123 is also located between the inner wall of the pillar 122 and the outer wall (side surface) of the support layer 124. This reduces or prevents the movement of the support layer 124 relative to the pillar 122. In other words, such an arrangement absorbs external impacts that could induce the support layer 124 to move, and thus reduces or prevents the movement of the support layer 124.

With a tensile modulus of elasticity for the first joint portion 123 of 0.001 N/mm^2 or greater, the first joint portion 123 located between the support layer 124 and the pillar 122 can withstand external resistive forces and reduce or prevent the movement of the support layer 124 relative to the pillar 122. This maintains a constant distance between the support layer 124 and the pillars 122.

As described above, the outer wall (i.e., the side surface) of the support layer 124 is fixed to the inner wall of the pillar 122. This configuration increases the mechanical strength much more than the case where the support layer 124 is fixed only at the bottom surface. In particular, the fixation of the side surface extending in the Z-direction serves to resist the impulsive vibration occurring on the XY plane in the lateral direction of the mirror-portion base 102. When fixed only at the bottom surface, the support layer 124 becomes vulnerable to shear stress applied parallel to the XY plane. However, when fixed at the side surface extending in the Z-direction, the support layer 124 exhibits a counteracting force proportional to the Young's modulus of the first joint portion 123.

With an increasing gap between the support layer 124 and the pillar 122, the distance between the support layer 124 and the inner wall of the pillar 122 becomes excessively large. In consideration of the climbing up of the first joint portion 123 along the side face of the support layer 24, the gap value is preferably 100 microns or less. However, this is not definitive as the viscosity of the adhesive resin used in the present embodiment may influence, for example, the degree of climb and the appropriateness of the gap value. In FIG. 9, the support layer 124 and the mirror-portion base 102 are separated by the first joint portion 123. However, in some embodiments, the support layer 124 and the mirror-portion base 102 are not separated. For example, the support layer 124 partially or entirely contacts the mirror-portion base 102. Alternatively, the support layer 124 is bonded to the pillar 122 by the first joint portion 123.

A joining method includes using the first joint portion 123. As the joining method, for example, a metal bonding technique that utilizes a layered structure such as Titanium (Ti)/Nickel (Ni)/Au may be employed to create a robust bond between the Au layers. For wafer bonding, preferable methods include metallic diffusion bonding, eutectic bonding, adhesive bonding, anodic oxidation bonding, and glass frit bonding. Alternatively, a joining method such as Si-to-Si joining is also acceptable.

The shapes of the first to fourth drive portions 112a to 112d are not limited to the above shapes as long as the reflecting surface is rotated by actuators. The first support portion 120 may include a detector of displacements, a heater, and electric wiring, in addition to the first to fourth drive portions 112a to 112d.

The signal waveform of the applied voltage is not limited to a waveform according to the above embodiments. The signal waveform may be a periodic waveform such as a sine wave, rectangular wave, or sawtooth wave. In some embodiments, the signal waveform is a more complicated periodic waveform. Alternatively, the applied voltage may be a direct current (DC) drive voltage. Further, the driving waveform frequency may be adjusted to approach the resonance frequency unique to the structure, and Lissajous scanning may be performed.

The method of driving the first to fourth drive portions 112a to 112d includes piezoelectric driving, electrostatic driving, electromagnetic driving, and thermoelectric driving. However, piezoelectric driving is preferred due to its suitability for lower voltage applications and higher integration.

Figure 10:
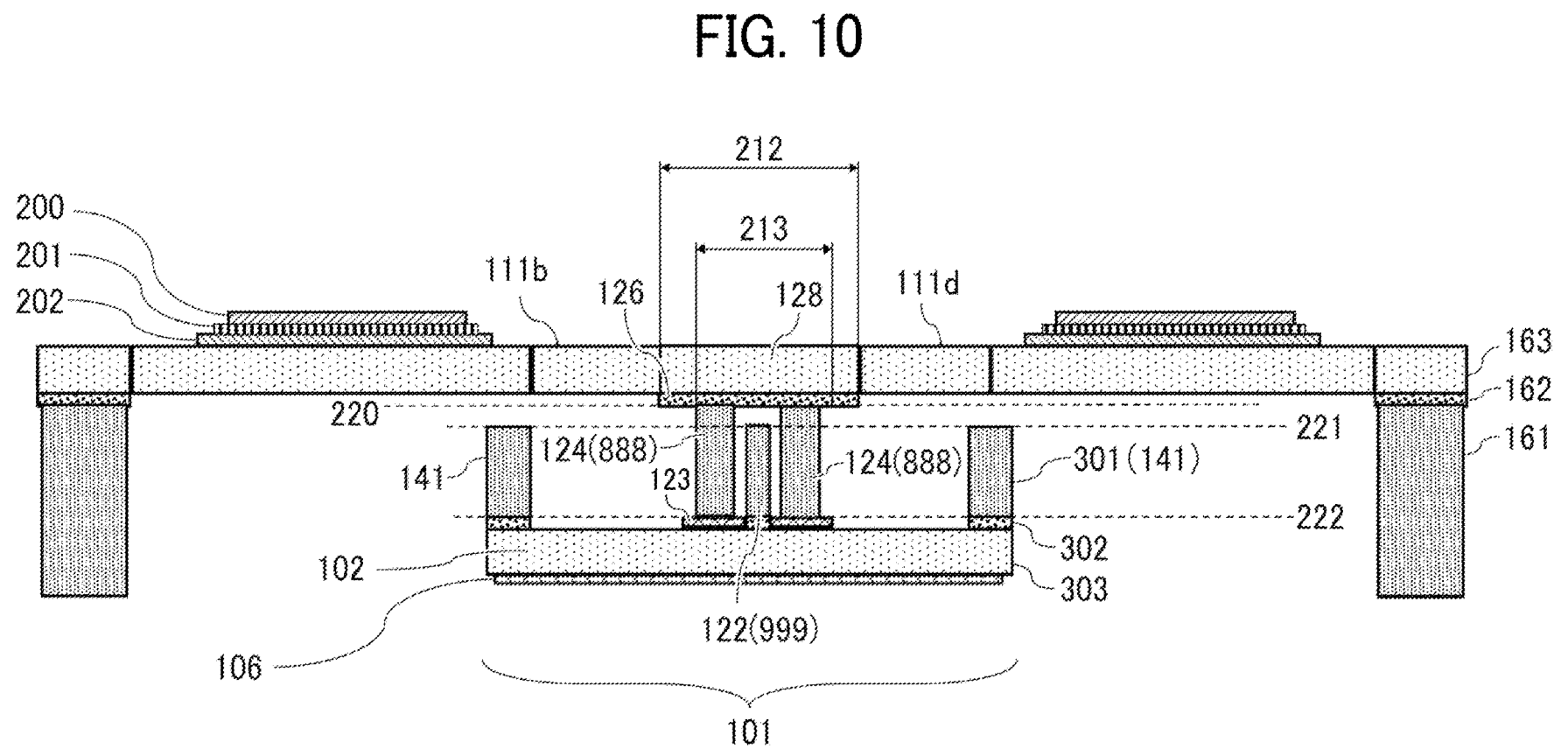

FIG. 10 is a cross-sectional view of a movable device according to a first modification of the above embodiments of the present disclosure, where the cross section is taken in the direction corresponding to the A-A' cross-section in FIG. 7. In FIG. 10 according to the first modification, the positions of the pillar 122 and the support layer 124 differ from those in FIG. 7. Further, the support layer 124 in FIG. 10 has a hollow cylindrical shape and encircles the pillar 122. The support layer 124 according to the first modification serves as a connector 888 that connects the movable portion 3 and the mirror portion 101 in a direction intersecting with a reflecting surface of the mirror portion 101 (i.e., in a direction intersecting with the first support portion 120, or the Z-direction). In this configuration, the pillar 122 according to the first modification serves as a reinforcement section 999 that reinforces the connection between the support layer 124 and the mirror portion 101, i.e., the connection between the movable portion 3 and the mirror portion 101.

The movable portion 3 is connected to torsion bars 111b and 111d and is rotated by power from the first to fourth drive portions 112a to 112d. The movable portion 3 is formed by the silicon active layer 128 and the silicon oxide layer 126 of the first SOI substrate. The support layer 124, which is hollow cylindrical, protrudes downward from the silicon oxide layer 126 of the movable portion 3. The support layer 124 is formed from the first SOI substrate and is firmly integrated with the movable portion 3 by silicon covalent bonding. The support layer 124 is joined to the mirror-portion base 102 formed from the second SOI substrate by the first joint portion 123.

The second SOI substrate includes the mirror-portion base 102, a rib 141 formed at the edge of the mirror portion 101 and a pillar 122 formed at an end portion of the mirror, and the pillar 122. The pillar 122 is located inside the hollow-cylindrical support layer 124 in a radial direction of the support layer 124.

The pillar 122 at the center of the mirror portion 101 serves as a guide for mounting the hollow-cylindrical support layer 124. This facilitates the mounting process. The support layer 124 is higher than the pillar 122. This prevents interference between the pillar 122 and the movable portion 3.

Figure 11:
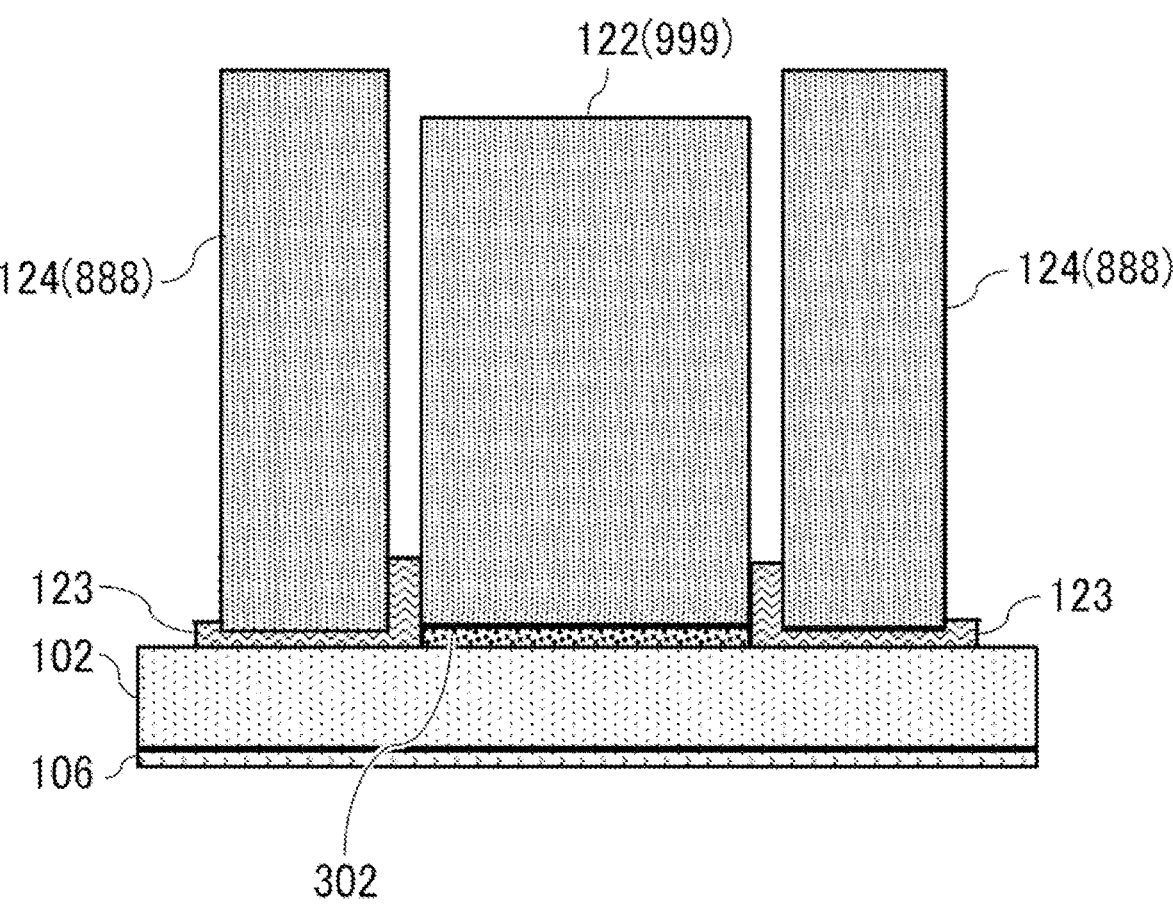
FIG. 11 is a cross-sectional view of a joint portion in the movable device in FIG. 10.

FIG. 11 is an enlarged cross-sectional view of the first joint portion 123 and its surrounding area in FIG. 10. In the first modification, the support layer 124 has a hollow cylindrical shape and encircles the pillar 122. The inner diameter of the support layer 124 exceeds the diameter of the pillar 122 in the radial direction by approximately several ten microns. In other words, a gap of several ten microns is provided between the outer wall (i.e., the side surface) of the pillar 122 and the inner wall of the support layer 124. The inner wall of the support layer 124 and the side surface of the pillar 122 face each other with the gap therebetween. A joint with strong mechanical strength can be achieved by forming such a face-to-face arrangement optimally. This allows the support layer 124 connected to the first to fourth drivers 110a to 110d to be firmly fixed to the mirror-portion base 102.

The support layer 124 is connected to the mirror-portion base 102 by the first joint portion 123. The pillar 122 is located at the center of the mirror portion 101, i.e., at the center of the movable portion 3. The support layer 124 is located to encircle the pillar 122. The first joint portion 123 is disposed so as to climb up the inner wall of the support layer 124 and the side surface of the pillar 122. In the manufacturing process, the first joint portion 123, which is in the form of an elastic paste, is pressed onto the support layer 124, causing the first joint portion 123 to deform appropriately before being cured in the subsequent curing process. The first joint portion 123 is also located between the support layer 124 and the pillar 122. This enables an increase in the adhesive area of the first joint portion 123 and also prevents the movement of the support layer 124 relative to the pillar 122. The reason for enhancing the joint strength in the joint portion is consistent with those of the above embodiments. In the first modification, the hollow-cylindrical support layer 124 is located on a concentric circle of the pillar 122, which has a solid cylindrical shape. This allows for a point-symmetrical deformation of the first joint portion 123. This further enhances the point symmetry of the center of gravity of the adhesive resin, and enables the stabilization of the rotation. The stability of the rotation can be expected to increase, particularly in terms of higher speed and enhanced vibration resistance.

Figure 12:
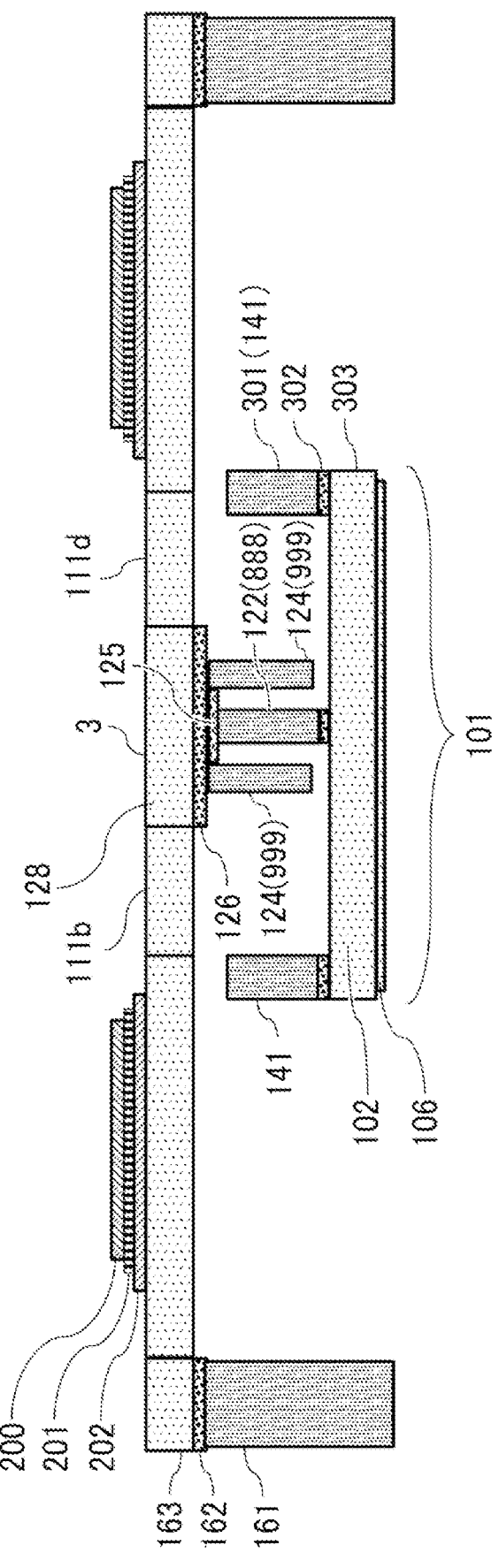
FIG. 12 is a cross-sectional view of a movable device according to a second modification of an embodiment of the present disclosure.

FIG. 12 is a cross-sectional view of a movable device according to a second modification of the above embodiments of the present disclosure, where the cross section is taken in the direction corresponding to the A-A' cross section in FIG. 7. In FIG. 12 according to the second modification, the positions of the pillar 122 and the support layer 124 differ from those in FIG. 7. The support layer 124, which is connected to the silicon oxide layer 126 of the movable portion 3, is integrated with movable portion 3, protruding in a hollow-cylindrical shape from the silicon oxide layer 126. The pillar 122, which is formed from the second SOI substrate and has a solid cylindrical shape, is located within the inner wall of the support layer 124. The pillar 122 is surrounded by the support layer 124. The pillar 122 is bonded or joined to the silicon oxide layer 126 of the movable portion 3 via an adhesive material 125. The support layer 124 serves as a reinforcement section. The pillar 122 serves as a connector. The pillar 122 according to the second modification serves as a connector 888 that connects the movable portion 3 and the mirror portion 101 in a direction intersecting with a reflecting surface of the mirror portion 101 (i.e., in a direction intersecting with the first support portion 120, or the Z-direction). In this configuration, the support layer 124 according to the second modification serves as a reinforcement section 999 that reinforces the connection between the support layer 124 and the mirror portion 101, i.e., the connection between the movable portion 3 and the mirror portion 101.

Figure 13:
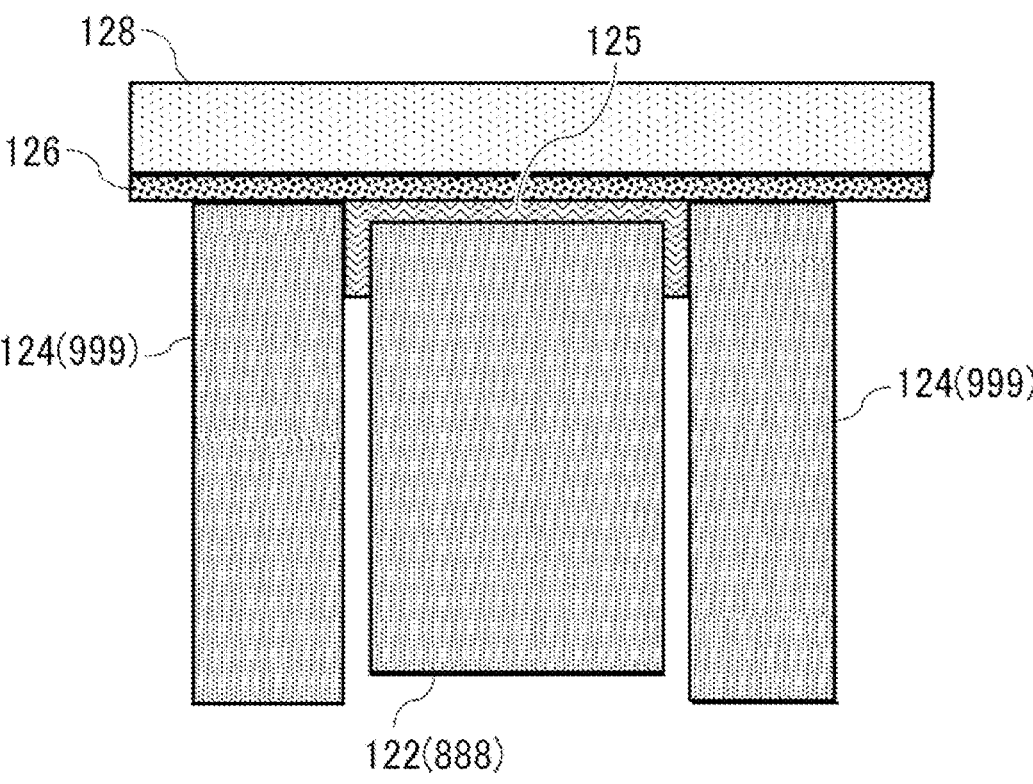
FIG. 13 is a cross-sectional view of a joint portion in the movable device in FIG. 12.

FIG. 13 is an enlarged cross-sectional view of the first joint portion 123 and its surrounding area in FIG. 12. The support layer 124 according to the second modification is hollow cylindrical. The inner diameter of the support layer 124 exceeds the diameter of the pillar 122 in the radial direction by approximately several ten microns. In other words, a gap of several ten microns is provided between the support layer 124 and the pillar 122. The inner wall of the support layer 124 and the side surface of the pillar 122 face each other with the gap therebetween. A joint with strong mechanical strength can be achieved by forming such a face-to-face arrangement optimally.

The pillar 122 is fixed to the silicon oxide layer 126 of the movable portion 3 via an adhesive material 125 (e.g., an adhesive resin). The adhesive material 125 is disposed so as to climb up to the side surface of the pillar 122 and the inner wall of the support layer 124. The hollow-cylindrical support layer 124 is located to encircle the solid-cylindrical pillar 122. Inside the hollow-cylindrical support layer 124, the adhesive material 125 is located to fill the space between the pillar 122 and the support layer 124. The adhesive material 125 is located between the side surface of the pillar 122 and the inner wall of the support layer 124. This allows an increase in the adhesive area of the adhesive material 125 and prevents the movement between the pillar 122 and the support layer 124. This enables a strong fixation between pillar 122, which is connected to the mirror-portion base 102, and the silicon oxide layer 126 of the movable portion 3.

Figure 14:
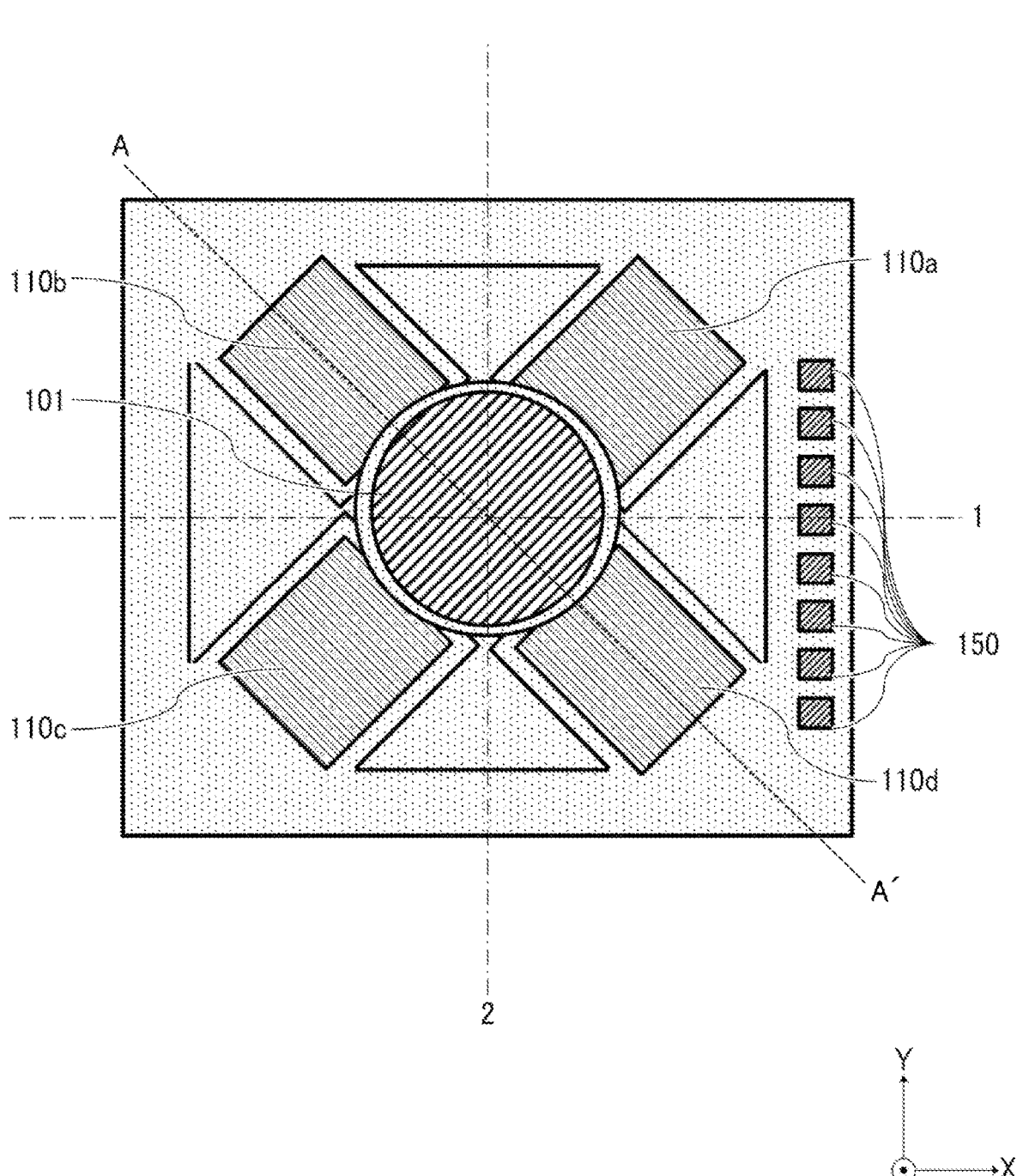
FIG. 14 is a plan view of a movable device according to a third modification of an embodiment of the present disclosure.

FIG. 14 is a diagram of a movable device according to a third modification of the above embodiments of the present disclosure. A mirror portion 101 is located at the center of the movable device and is supported by a torsion bar 111a. A first driver 110a including the torsion bar 111a and a first drive portion 112a is fixed to a first support portion 120. The mirror portion 101 is supported at four positions by the first to fourth drivers 110a to 110d. The four first to fourth drivers 110a to 110d are arranged point-symmetrically with respect to the mirror portion 101 in a plan view. The first to fourth drivers 110a to 110d each rotate the mirror portion 101 two-dimensionally through both positive and negative angles (i.e., across positive and negative angles). The plan view described above refers to viewing the XY plane in the +Z-direction in FIG. 14. In other words, the plan view refers to viewing the mirror portion 101 in the normal direction of the mirror portion 101 when the mirror portion 101 is not rotated.

Figure 15:
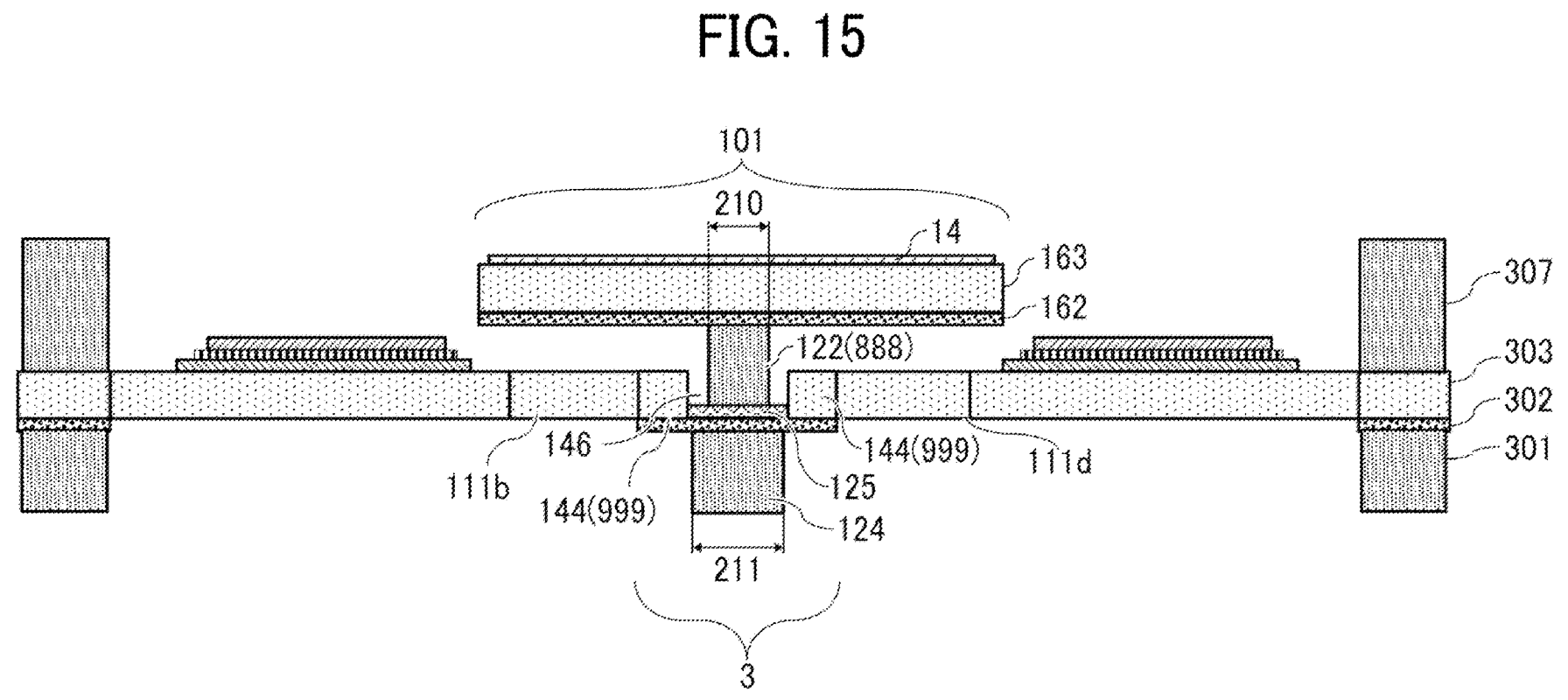

FIG. 15 is an A-A' cross-sectional view of the movable device in FIG. 14 according to the third modification of the above embodiments of the present disclosure, where the cross section is taken in the direction corresponding to the A-A' cross section in FIG. 7. The mirror portion 101, which is formed from the first SOI substrate, is connected to the movable portion 3 by a pillar 122. The mirror portion 101 includes the silicon active layer 163, the silicon oxide layer 162, and the reflecting surface 14. The pillar 122 is formed from a silicon support layer 161 of the first SOI substrate of the mirror portion 101 using semiconductor processing techniques, resulting in an integrated structure with the mirror portion 101. The interface between the pillar 122 and the silicon oxide layer 162 of the mirror portion 101 is securely bonded, creating a very strong connection.

The movable portion 3 is provided with a support layer 124 and a via 144 of the movable portion 3. The via 144 is formed together with a recess 146 in the silicon active layer 303 of the second SOI substrate by selective dry etching of the silicon active layer 303. The bottom of the recess 146 is formed by the silicon oxide layer 162 of the second SOI substrate and is surrounded by the via 144 of the movable portion 3. The side surface of the via 144, which is the inner wall of the recess 146 and the outer wall of the pillar 122 face each other. The pillar 122 serves as the connector, and the via 144 serves as the reinforcement section. The pillar 122 according to the third modification serves as a connector 888 that connects the movable portion 3 and the mirror portion 101 in a direction intersecting with a reflecting surface of the mirror portion 101 (i.e., in a direction intersecting with the first support portion 120, or the Z-direction). In this configuration, the via 144 according to the third modification serves as a reinforcement section 999 that reinforces the connection between the support layer 124 and the mirror portion 101, i.e., the connection between the movable portion 3 and the mirror portion 101.

The lower surface of the pillar 122, oriented with its normal in the −Z-direction, is bonded to the movable portion 3 via the adhesive material 125. In this arrangement, the movable portion 3 and the mirror portion 101 are jointed together. The bottom surface of the recess 146 is not limited to the silicon oxide layer 302, and may be formed by the support layer 124 formed by the silicon support layer 301 of the second SOI substrate. The adhesive material 125 contacts the side surface of the pillar 122 and the inner wall of the via 144. The adhesive material 125 is located between the side surface (i.e., the inner wall) of the via 144 and the side surface of the pillar 122. This configuration enables lateral fixation of the pillar 122. This increases the mechanical strength against lateral impact.

The support layer 124 is formed by the silicon support layer 301 of the second SOI substrate. The support layer 124 has a smaller inner diameter than the via 144. Designing to the appropriate size allows for optimal distribution of the strength, the size of torque, and weight reduction in the movable portion 3. In the present modification, the pillar 122 has a smaller diameter than the support layer 124 does. This configuration reduces the weight of the movable elements, including the mirror portion 101, the movable portion 3, and the pillar 122, and thus achieves a reduced moment of inertia.

For the adhesive material 125, a liquid with designed and controlled viscosity is applied to a specified position in a predetermined volume using a dispenser during the application stage. After the application, the mirror portion is mounted, and the adhesive material 125 is pressed and deformed by the end face of the pillar 122. In the process of applying the adhesive material 125 or during the pressing and deformation of the adhesive material 125, the applied adhesive material 125 may extend onto the movable portion 3 or the torsion bars 111b and 111d.

In the present modification, the recess 146 is located in the silicon active layer 303. The recess 146 prevents the liquid adhesive material 125 from overflowing. If the overflow reaches the torsion bars 111b and 111d, the cured adhesive material 125 could negatively affect the spring constant of the torsion bars 111b and 111d, resulting in unstable movement. However, the recess 146 allows the adhesive material 125 to be placed at the appropriate location within the movable portion 3, resulting in a stable oscillation of the support layer 124 and allowing for high-speed rotation of the mirror portion 101.

Since the torsion bars 111*a* to 111*d* are also formed by the silicon active layer 303, the torsion bars 111*a* to 111*d* and the reinforcement section, which is the recess 146, are connected to each other by a crystalline structure of covalent bonding. The torsion bars 111*a* to 111*d* enhance the motion from the first to fourth drive portions 112*a* to 112*d* by their spring functions and directly transmit the motion to the reinforcement section 999. The power transmission paths of all the first to fourth drive portions 112*a* to 112*d*, the torsion bars 111*a* to 111*d*, and the reinforcement section 999 have the same crystalline structure of covalent bonding, resulting in a robust structure without any interfaces. This configuration prevents failures such as interfacial peeling.

In the present modification, the surfaces of the reflecting surface 14 and the electrode connection parts 150 are placed in a common plane. This eliminates the use of a three-dimensional mounting approach to access electrodes from the back surface. Due to the placement of these surfaces in a common plane, for example, typical wire bonding techniques can be employed for electrical mounting. Thus, low-cost mounting is achieved.

Figure 16D:
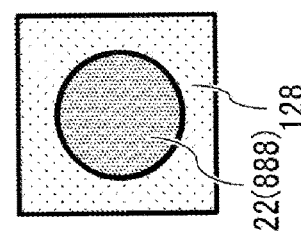
FIG. 16D is a B-B' cross-sectional view of a pillar of the movable device in FIG. 16A, according to still another embodiment of the present disclosure.
Figure 16C:
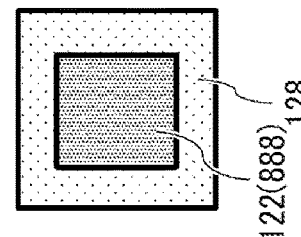
FIG. 16C is a B-B' cross-sectional view of a pillar of the movable device in FIG. 16A, according to another embodiment of the present disclosure.
Figure 16B:
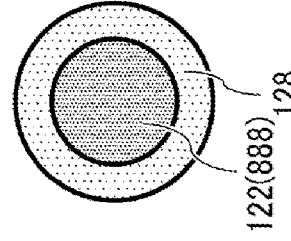
FIG. 16B is a B-B' cross-sectional view of a pillar of the movable device in FIG. 16A, according to an embodiment of the present disclosure.
Figure 16A:
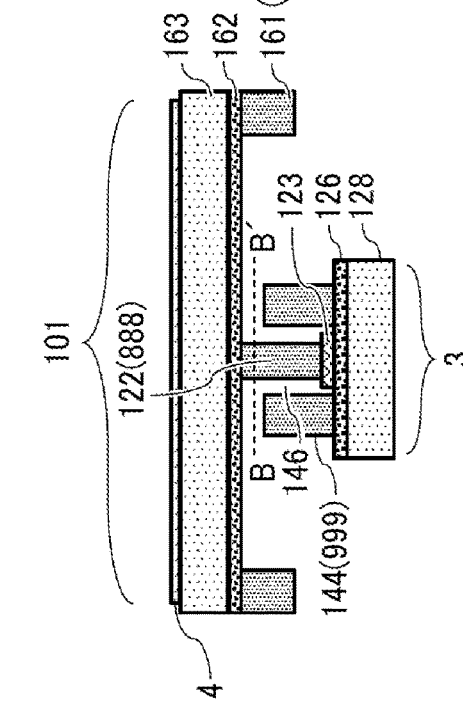
FIG. 16A is a cross-sectional view of a movable device according to a fourth modification of an embodiment of the present disclosure.

FIG. 16A is a diagram of a movable device according to a fourth modification of an embodiment of the present disclosure. FIGS. 16B to 16D are B-B' cross-sectional views of the pillar 122 of the movable device in FIG. 16A, according to embodiments of the present disclosure. FIGS. 16A to 16D are diagrams of the shape of the pillar 122. FIG. 16A is a cross-sectional view of a mirror portion 101 formed from the first SOI substrate, a movable portion 3 formed from the second SOI substrate, and their surroundings. A torsion bar and a driver connected to a movable portion 3 are not illustrated in FIG. 16A. FIG. 16B is a B-B' cross-sectional view of the pillar 122 of the movable device in FIG. 16A. In the B-B' cross-sectional view of FIG. 16B, the shape of the silicon active layer 128 of the movable portion 3 below the cross section (i.e., the line B-B') is also illustrated for easy understanding. In FIG. 16B, the cross section of the pillar 122 is circular.

When the cross-sectional shape of the pillar 122 is circular, the pillar is point-symmetric. During the coating process and the pressing deformation of the first joint portion 123, the first joint portion 123 deforms symmetrically. This allows the first joint portion 123 to be positioned with good symmetry. When rotating in two dimensions, the weight is well-balanced, allowing for stable rotation.

FIG. 16C is a diagram of a pillar according to another embodiment of the present disclosure. When the cross-sectional shape of the pillar 122 is rectangular as illustrated in FIG. 16C, the area of the first joint portion 123 applied to the side surface of the pillar 122 can be increased, and the joint strength can be enhanced.

As illustrated in FIG. 16D, the cross-sectional shapes of the movable portion 3 and the pillar 122 may not be similar to each other, but may be different from each other.

Figure 17A:
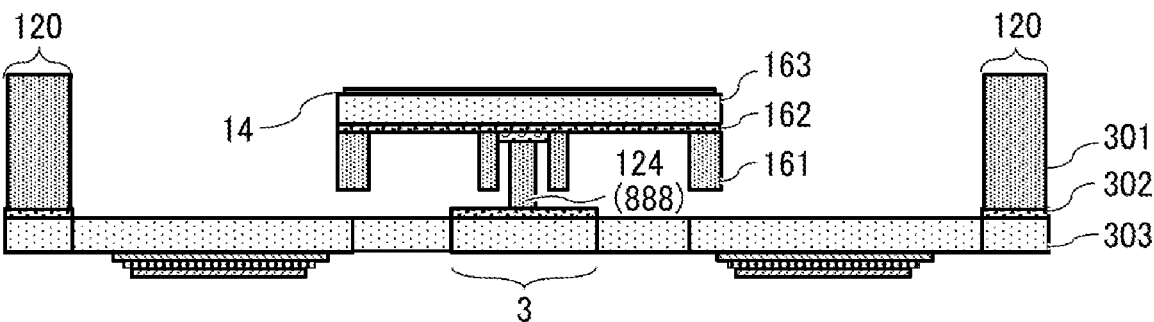
FIG. 17A is a cross-sectional view of a movable device according to an embodiment of the present disclosure.
Figure 17B:
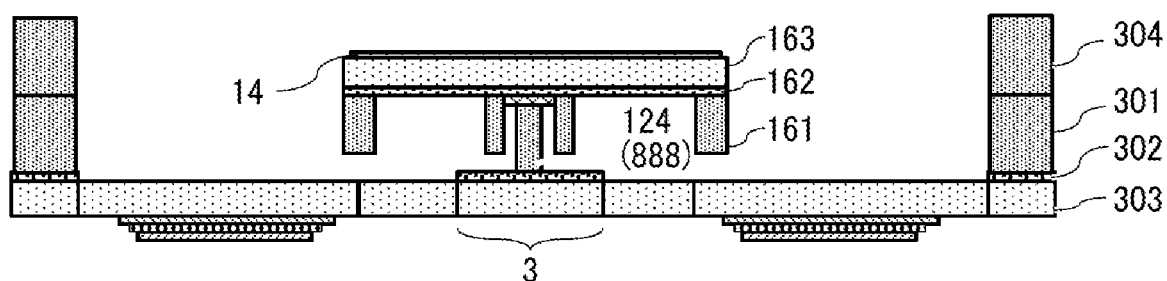
FIG. 17B is a cross-sectional view of a movable device according to a fifth modification of an embodiment of the present disclosure.
Figure 17C:
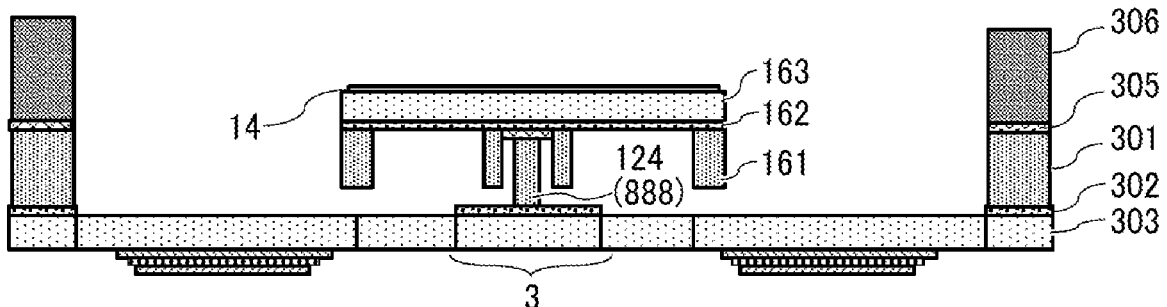
FIG. 17C is a cross-sectional view of a movable device according to a sixth modification of an embodiment of the present disclosure.

FIGS. 17A, 17B, and 17C are cross-sectional views of a first support portion 120 according to a modification of an embodiment of the present disclosure. FIG. 17A illustrates the same modification as in FIG. 8, in which the first support portion 120, which is formed from the second SOI substrate, is formed by the silicon support layer 301. FIG. 17B is a diagram of a movable device according to a fifth modification of an embodiment of the present disclosure. A Si substrate is joined only to a first support portion 120, and a silicon support layer 304 is added to the first support portion

120. FIG. 17C is a diagram of a movable device according to a sixth modification of an embodiment of the present disclosure. A support portion 306, which is fabricated from materials such as aluminum or ceramics, is joined only to a first support portion 120 by an adhesive layer 305. The first support portion 120 formed from a material with high hardness enhances the overall strength of the movable device.

Figure 18A:
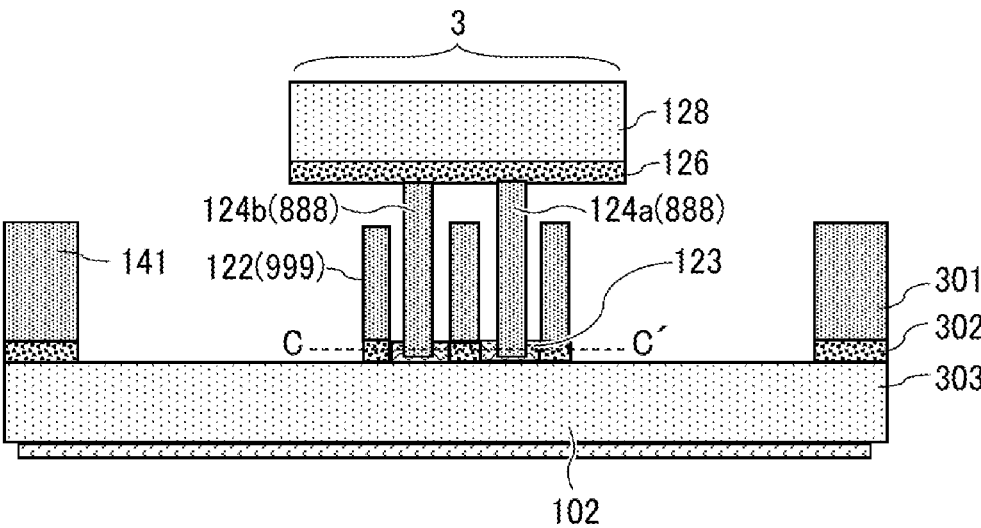
FIG. 18A is a cross-sectional view of a movable device according to a seventh modification of an embodiment of the present disclosure.

FIG. 18A is a cross-sectional view of a movable device according to a seventh modification of an embodiment of the present disclosure. Two support layers 124*a* and 124*b* are formed in a movable portion 3. The two support layers 124*a* and 124*b* are joined to a silicon oxide layer 302 of a mirror-portion base 102.

Figure 18B:
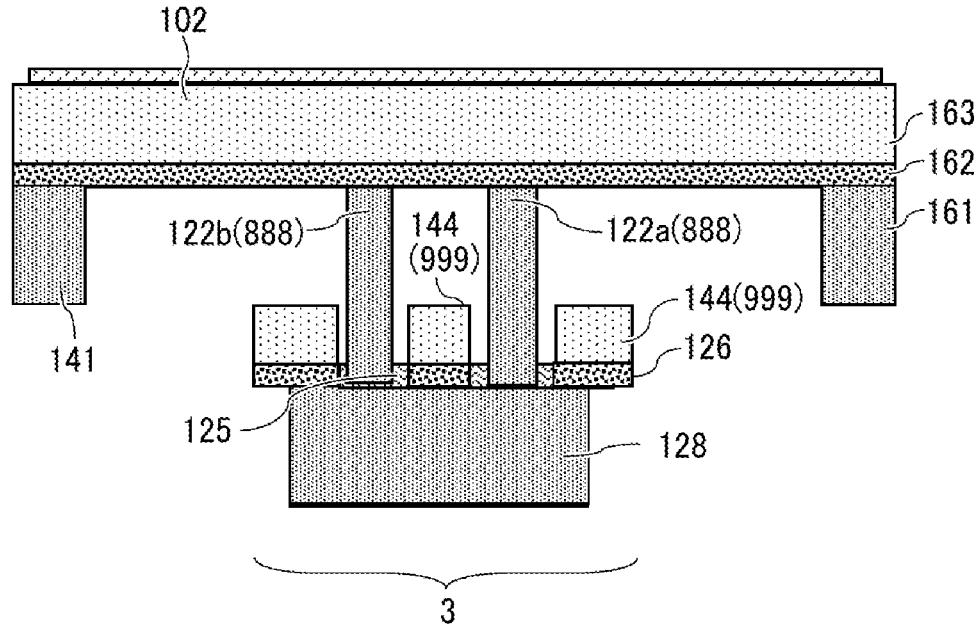
FIG. 18B is a cross-sectional view of a movable device according to an eighth modification of an embodiment of the present disclosure.

FIG. 18B is a cross-sectional view of a movable device according to an eighth modification of the above embodiments of the present disclosure, where the cross section is taken in the direction corresponding to the A-A' in FIG. 7. In the eighth modification, a silicon support layer 161 of a mirror-portion base 102 that is formed from the first SOI substrate serves as pillars 122*a* and 122*b*. In this configuration, two pillars 122*a* and 122*b* are used. The pillars 122*a* and 122*b* are bonded, or joined to a silicon active layer 128 of a movable portion 3 via an adhesive material 125. The silicon active layer 128 and the silicon oxide layer 126 of the movable portion 3 have two recesses where the pillars 122*a* and 122*b* are located, respectively.

In both the seventh modification and the eighth modification, the mirror-portion base 102 and the movable portion 3 are bonded by two pillars or two support portions.

Figures 19A, 19B:
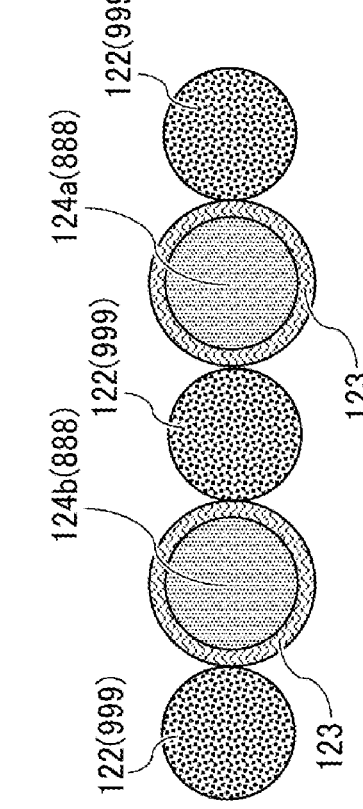
FIG. 19A is a C-C' cross-sectional view of multiple support layers of the movable device in FIG. 18A, according to an embodiment of the present disclosure.
FIG. 19B is a C-C' cross-sectional view of pillars concentrically arranged in the movable device in FIG. 18A, according to an embodiment of the present disclosure.

FIGS. 19A and 19B are C-C' cross-sectional views of the multiple support layers or the pillars of the movable device in FIC. 18A of the seventh modification, according to embodiments of the present disclosure. In FIG. 19A, two support layers, i.e., a support layer 124*a* and a support layer 124*b* are arranged in parallel. Three pillars 122 are arranged in parallel with the support layer 124*a* and the support layer 124*b* respectively placed in between the pillars 122.

FIG. 19B is a diagram of two pillars arranged concentrically according to an embodiment of the present disclosure. In their radial direction, a solid-cylindrical first pillar 122*a* (a first reinforcement), a support layer 124*a*, and a second pillar 122*b* (a second reinforcement) are arranged sequentially from the center outward. The two pillars may be arranged in parallel. Alternatively, the solid-cylindrical first pillar 122*a* may be arranged inside the hollow-cylindrical second pillar 122*b*. Further, a first joint portion 123 is located between the first pillar 122*a* and the second pillar 122*b*, achieving a strong fixation for both of the first pillar 122*a* and the second pillar 122*b*.

Joining across multiple planes increases the strength of the connection and enables a wider angle of view. In the present modification with reference to FIG. 19A, two support layers 124*a* and 124*b* are used. In the present modification with reference to FIG. 19B, the first pillar 122*a* and the second pillar 122*b* are used. However, the number and shape of the support layers and pillars are not limited to those according to the above embodiments of the present disclosure. The connector using multiple support layers and pillars enhances structural strength.

Figure 20:
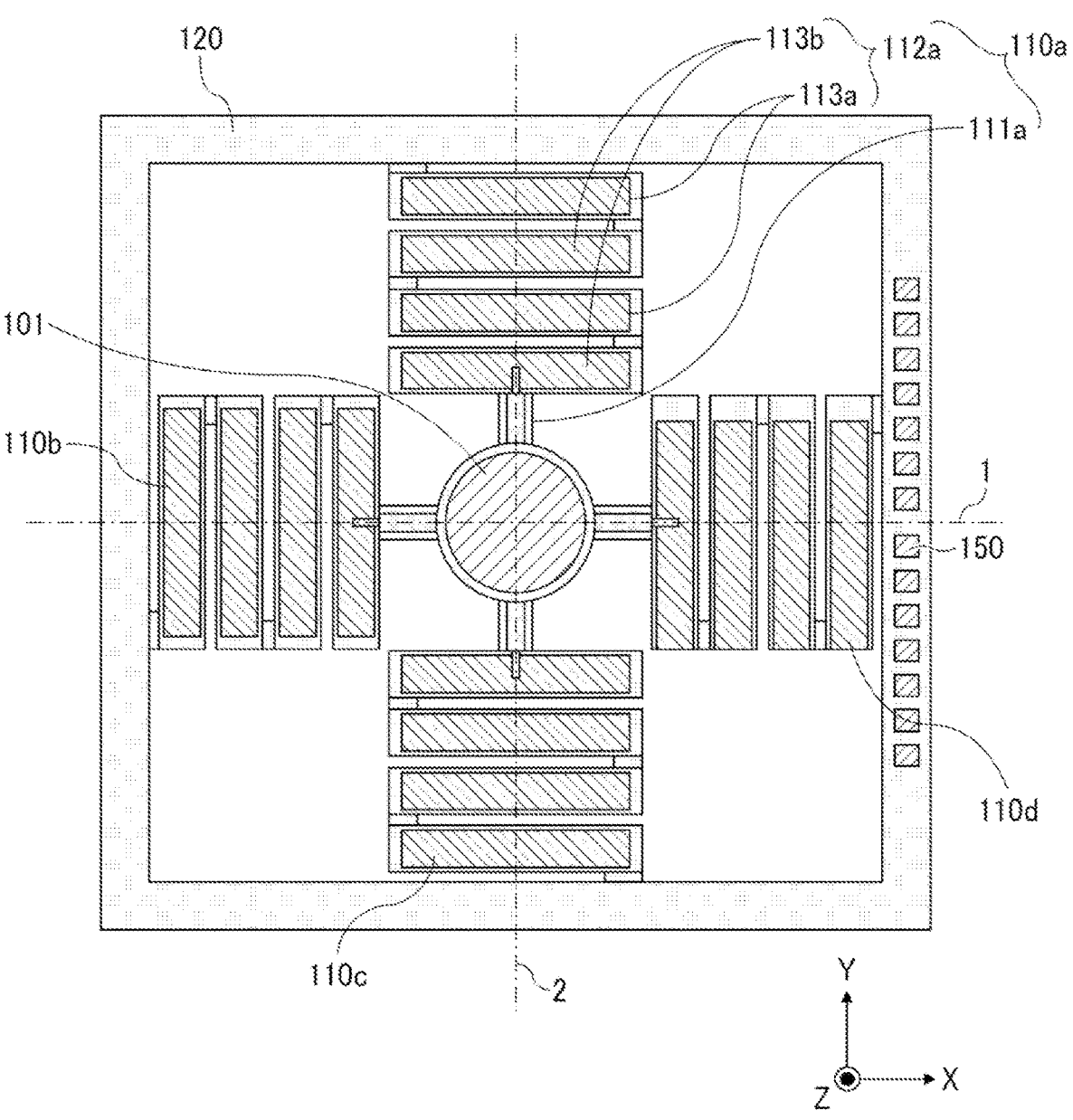
FIG. 20 is a plan view of a movable device according to a ninth modification of an embodiment of the present disclosure.

FIG. 20 is a plan view of a movable device according to a ninth modification of an embodiment of the present disclosure. FIG. 20 is a diagram of a movable device including a support portion 120 and multiple beams connected to the support portion. The multiple beams are connected in a folded or zigzag matter to form a meander structure.

The shapes and details of the first support portion 120 and the first to fourth drive portions 112a to 112b are not limited to those described in the present modification. However, the support bodies of the first to fourth drive portions 112a to 112b have the meander structure. This prevents an increase in structural nonlinearity due to an increase in the size and weight of the first to fourth drivers 110a to 110d, which are formed from the first SOI substrate, and their surroundings. Thus, a wider angle of view is achieved. In some examples, piezoelectric-driver groups A 113a and piezoelectric-driver groups B 113b are alternately located on the +Z-side surfaces of the beams, respectively. In such a configuration, the deflection angle of the mirror can be controlled in a positive direction or a negative direction without using negative voltage by driving the piezoelectric-driver groups A 113a alone (i.e., not driving the piezoelectric-driver group B 113b) or the piezoelectric-driver groups B 113b alone (i.e., not driving the piezoelectric-driver groups A 113a). Out-of-phase voltages are applied to the piezoelectric-driver groups A 113a (or a piezoelectric driver A) and the piezoelectric-driver groups B 113b (or a piezoelectric driver B) for switching the applied voltage signals in the time domain. During this process, a time delay is intentionally introduced between the signal switches of the piezoelectric-driver groups A 113a and the piezoelectric-driver groups B 113b. This results in mechanical vibrations that are out of phase between the piezoelectric-driver groups A 113a and the piezoelectric-driver groups B 113b, canceling out vibration ringing.

The high-frequency fibrillation such as ringing may adversely affect, for example, the joint surface, and the peeling can be reduced or prevented by canceling out the ringing.

Figure 21:
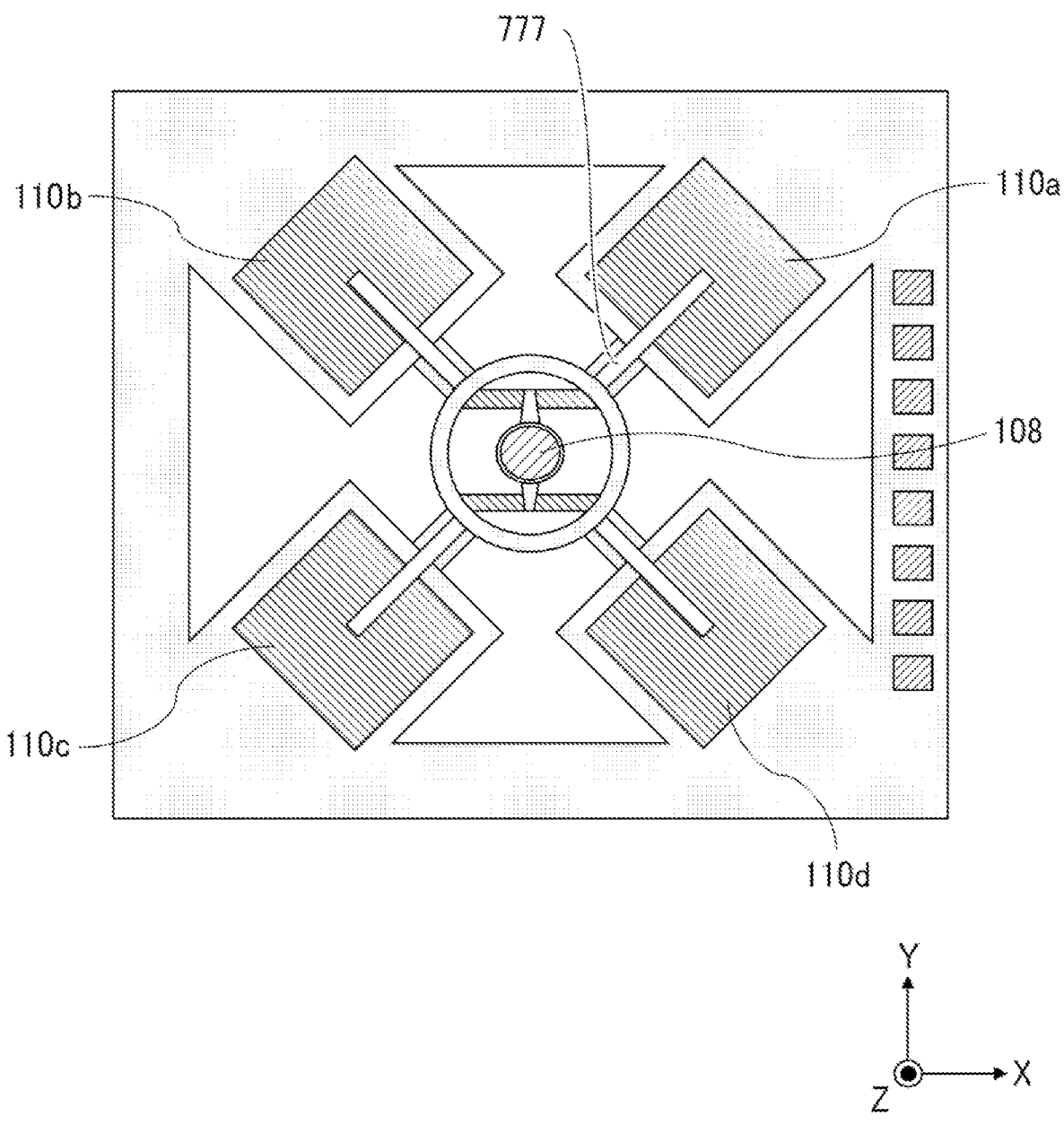
FIG. 21 is a plan view of a movable device according to a tenth modification of an embodiment of the present disclosure.

FIG. 21 is a plan view of a movable device according to a tenth modification of an embodiment of the present disclosure. The first SOI substrate is provided with first to fourth drivers 110a to 110d including first to fourth drive portions 112a to 112d and torsion bars 111a to 111d. In the following description, the first driver 110a and the torsion bar 111a are used as illustrations. However, a similar configuration applies to the other drivers 110b, 110c, and 110d, and the other torsion bars 111b, 111c, and 111d. The first driver 110a has an opening 777. The torsion bar 111a includes two torsion bars. The opening 777 extends to a point close to the center of the first drive portion 112a. The opening 777 in the first driver 110a allows an increase in the elasticity of the torsion bar 111a, achieving a higher deflection angle of the movable portion. Further, the movable device according to the tenth modification includes an optical functional element 108 such as a diffraction element on the first SOI substrate. In some embodiments, the optical functional element 108 is replaced with the mirror portion 101 according to any of the above embodiments of the present disclosure, and the other elements are the same as those of any of the above embodiments of the present disclosure. The details of the optical functional element are not limited to the above embodiments. The optical functional element may have not only a reflection function such as a mirror but also a function of causing wavelength dispersion or a light condensing function such as a lens. The optical function element serves as a reflector.

Embodiments incorporating a movable device according to an embodiment of the present disclosure are described below.

Optical Scanning System

An optical scanning system incorporating a movable device according to an embodiment of the present disclosure is described in detail with reference to FIGS. 22 to 25.

Figure 22:
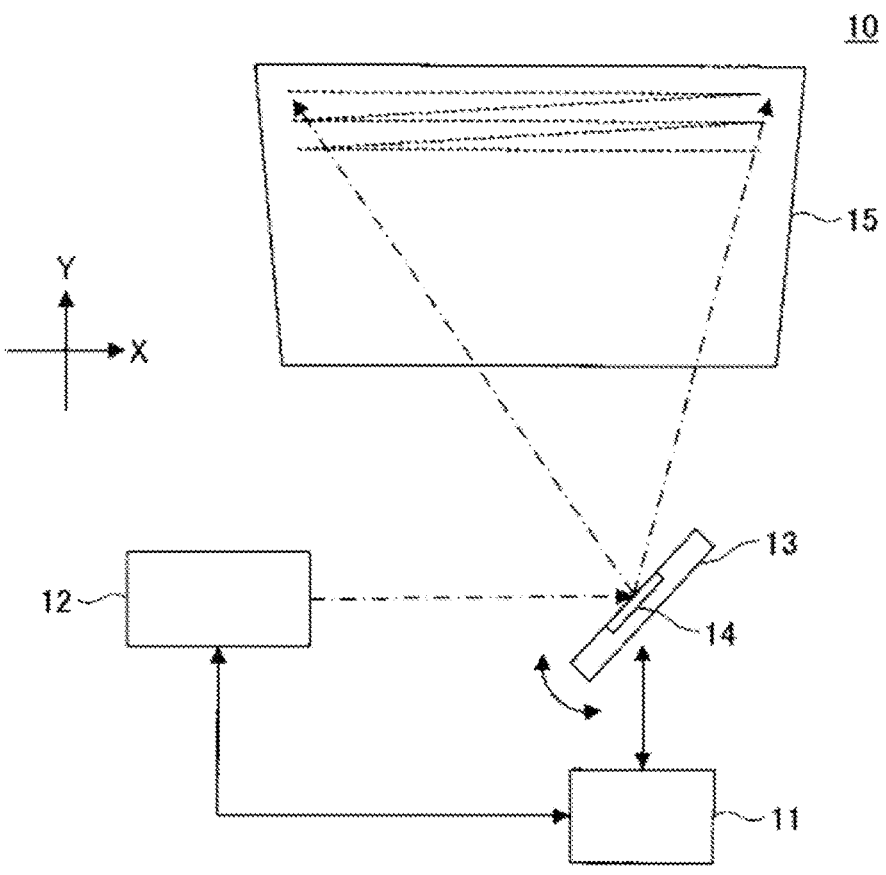
FIG. 22 is a schematic diagram of an optical scanning system according to an embodiment of the present disclosure.

FIG. 22 is a schematic diagram of an optical scanning system according to an embodiment of the present disclosure. As illustrated in FIG. 22, an optical scanning system 10 scans a target surface 15 by deflecting light emitted from a light-source device 12 using a reflecting surface 14 in a movable device 13, under the control of a control device 11

The optical scanning system 10 includes the control device 11, the light-source device 12, and the movable device 13 including the reflecting surface 14.

The control device 11 is an electronic circuit unit including, for example, a central processing unit (CPU) and a field-programmable gate array (FPGA). The movable device 13 includes, for example, the reflecting surface 14. The movable device 13 is a micro-electromechanical systems (MEMS) that can move the reflecting surface 14. The light-source device 12 is, for example, a laser device that emits a laser beam. The target surface 15 is, for example, a screen.

The control device 11 generates control instructions for the light-source device 12 and the movable device 13 based on the acquired optical scanning information, and outputs driving signals to both the light-source device 12 and the movable device 13 in accordance with the control instructions.

The light-source device 12 emits light based on the received driving signal. The movable device 13 moves the reflecting surface 14 in at least one of a uniaxial direction and a biaxial direction, based on the received driving signal.

This allows, for example, the control device 11 to operate based on image information, which serves as optical scanning information. By doing so, the movable device 13 can move the reflecting surface 14 back and forth in a specified range in the biaxial direction. The light emitted from the light-source device 12 is then deflected by the reflecting surface 14 about a specific axis when striking the reflecting surface 14, enabling optical scanning. As a result, any desired image can be projected onto the target surface 15. FIG. 22 is a schematic diagram illustrating the projection of an image using, for example, raster scanning. However, the movable device according to an embodiment of the present disclosure may project an image using Lissajous scanning or vector scanning. The movable device and its control by the control device according to an embodiment of the present disclosure are described in detail later.

Figure 23:
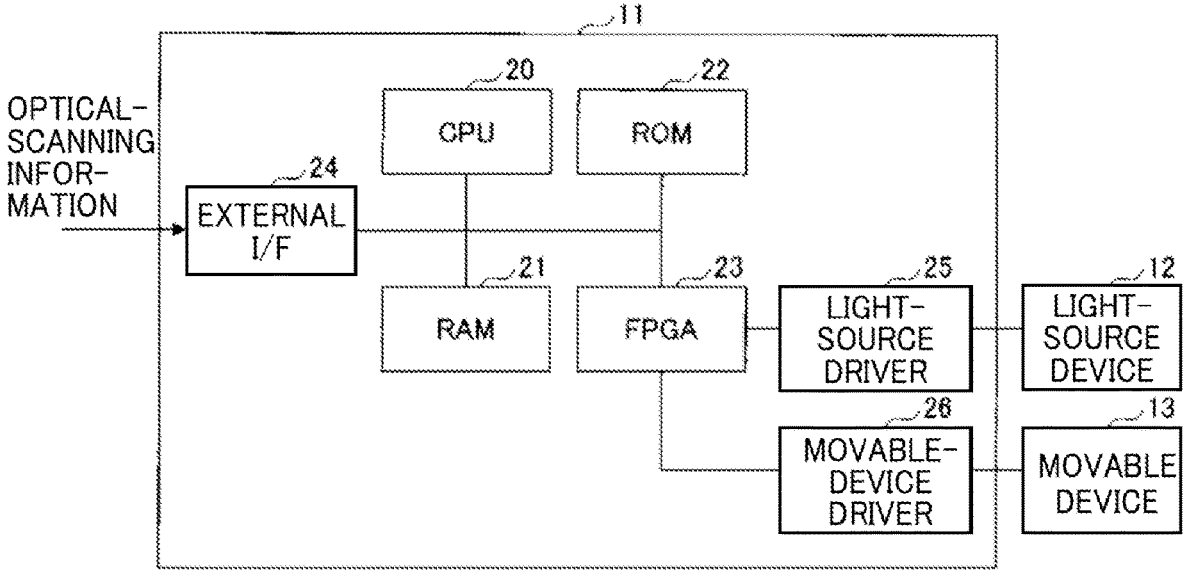
FIG. 23 is a block diagram of a hardware configuration of the optical scanning system in FIG. 22, according to an embodiment of the present disclosure.

A hardware configuration of the optical scanning system 10 according to an embodiment of the present disclosure is described with reference to FIG. 23. As illustrated in FIG. 23, the optical scanning system 10 includes the control device 11, the light-source device 12, and the movable device 13, which are electrically connected. The control device 11 includes a CPU 20, a random access memory (RAM) 21, a read-only memory (ROM) 22, an FPGA 23, an external interface (I/F) 24, a light-source driver 25, and a movable-device driver 26.

The CPU 20 is an arithmetic device that reads programs and data from storage devices, such as the ROM 22, into the RAM 21 and processes the programs and data to control and implement the functions of the entire control device 11.

The RAM 21 is a volatile storage device that temporarily holds a program and data.

The ROM 22 is a non-volatile storage device that can hold programs and data even after the power is turned off, and stores the programs and data for processing that is executed by the CPU 20 to control the functions of the optical scanning system 10.

The FPGA 23 is a circuit that outputs proper control signals suitable for the light-source driver 25 and the movable-device driver 26 in accordance with the processing performed by the CPU 20.

The external I/F 24 is, for example, an interface with respect to an external device or a network. The external device may be, for example, a host device such as a personal computer (PC); or a storage device, such as a universal serial bus (USB) memory, a secure digital (SD) card, a compact disk (CD), a digital versatile disk (DVD), a hard disk drive (HDD), or a solid-state drive (SSD). The network may be, for example, a controller area network (CAN) of a vehicle, a local area network (LAN), or the Internet. The external I/F 24 can have any configuration that can achieve connection to an external device or communication with an external device. The external I/F 24 may be provided for each external device.

The light-source driver 25 is an electric circuit that outputs a driving signal such as a drive voltage to the light-source device 12 in accordance with the received control signal.

The movable-device driver 26 is an electric circuit that outputs a driving signal such as a drive voltage to the movable device 13 in accordance with the received control signal.

In the control device 11, the CPU 20 acquires optical-scanning information from an external device or a network through the external I/F 24. As far as the CPU 20 can acquire the optical-scanning information, the optical-scanning information is stored in the ROM 22 or the FPGA 23 in the control device 11. Alternatively, a storage device such as an SSD is additionally included in the control device 11, and the optical-scanning information is stored in the storage device.

In the present embodiment, the optical-scanning information indicates how the target surface 15 is to be optically scanned. In some embodiments, the optical-scanning information is image data used for optical scanning to display an image. In some other embodiments, the optical-scanning information is writing data indicating the writing sequence and the writing locations when optical writing is performed by optical scanning. In an alternate embodiment, the optical-scanning information is irradiation data indicating the time of light irradiation for object recognition and its irradiation range when object recognition is performed by optical scanning.

The control device 11 enables the functional configuration described below by using instructions from the CPU 20 and the hardware configuration illustrated in FIG. 23.

Figure 24:
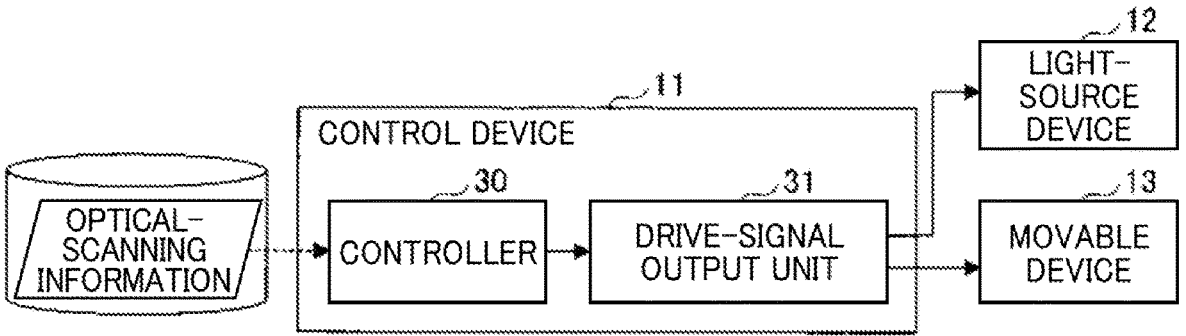
FIG. 24 is a block diagram of a functional configuration of a control device according to an embodiment of the present disclosure.

The functional configuration of the control device 11 of the optical scanning system 10 is described with reference to FIG. 24. FIG. 24 is a block diagram of the functional configuration of the control device 11 of the optical scanning system 10 according to an embodiment of the present disclosure.

As illustrated in FIG. 24, the control device 11 includes the functions of a controller 30 and a driving-signal output unit 31.

The controller 30 is implemented by, for example, the CPU 20 and the FPGA 23. The controller 30 acquires optical-scanning information from an external device and converts the optical-scanning information into a control signal, outputting the control signal to the driving-signal output unit 31. For example, the controller 30 acquires image data serving as the optical-scanning information from an external device and generates a control signal from the image data through predetermined processing, outputting the control signal to the driving-signal output unit 31. The driving-signal output unit 31 is implemented by, for example, the light-source driver 25 and the movable-device driver 26. The driving-signal output unit 31 outputs a driving signal to the light-source device 12 or the movable device 13 in accordance with the received control signal.

The driving signal is a signal for controlling the driving of the light-source device 12 or the movable device 13. In the light-source device 12, the driving signal is, for example, a drive voltage that controls the irradiation time and the irradiation intensity of the light source. In the movable device 13, the driving signal is, for example, a drive voltage that controls the time and range of movement of the reflecting surface 14 of the movable device 13.

Figure 25:
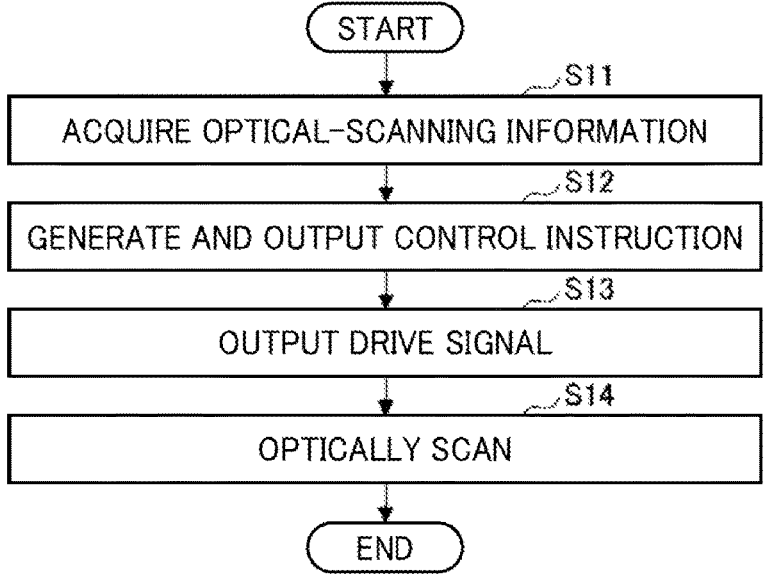
FIG. 25 is a flowchart of a process performed by the optical scanning system in FIG. 23, according to an embodiment of the present disclosure.

The process of optically scanning the target surface 15 performed by the optical scanning system 10 is described with reference to FIG. 25. FIG. 25 is a flowchart of a process performed by the optical scanning system according to an embodiment of the present disclosure.

In step S11, the controller 30 acquires optical-scanning information from, for example, an external device.

In step S12, the controller 30 generates control signals from the acquired optical-scanning information and outputs the control signals to the driving-signal output unit 31.

In step S13, the driving-signal output unit 31 outputs driving signals to the light-source device 12 and the movable device 13 based on the received control signals.

In step S14, the light-source device 12 emits light based on the received driving signal. In addition, the movable device 13 moves the reflecting surface 14 based on the received driving signal. The driving of the light-source device 12 and the movable device 13 causes light to be deflected in a given direction and undergo optical scanning.

In the above-described optical scanning system 10, one control device 11 has a device and a function for controlling both the light-source device 12 and the movable device 13. However, in some embodiments, the optical scanning system 10 may include a control device for the light-source device and another control device for the movable device, which are separated from each other.

In the above-described optical scanning system 10, one control device 11 has the functions of the controller 30 and the functions of the driving-signal output unit 31 for the light-source device 12 and the movable device 13. These functions may be implemented by separate elements or devices. In some embodiments, the optical scanning system 10 includes a driving-signal output device including the driving-signal output unit 31 in addition to the control device 11 including the controller 30. In the above-described optical scanning system 10, an optical deflection system may be configured to include a control device 11 and a movable device 13 having a reflecting surface 14.

Image Projection Apparatus

An image projection apparatus incorporating a movable device according to an embodiment of the present disclosure is described in detail with reference to FIGS. 26 and 27.

Figure 26:
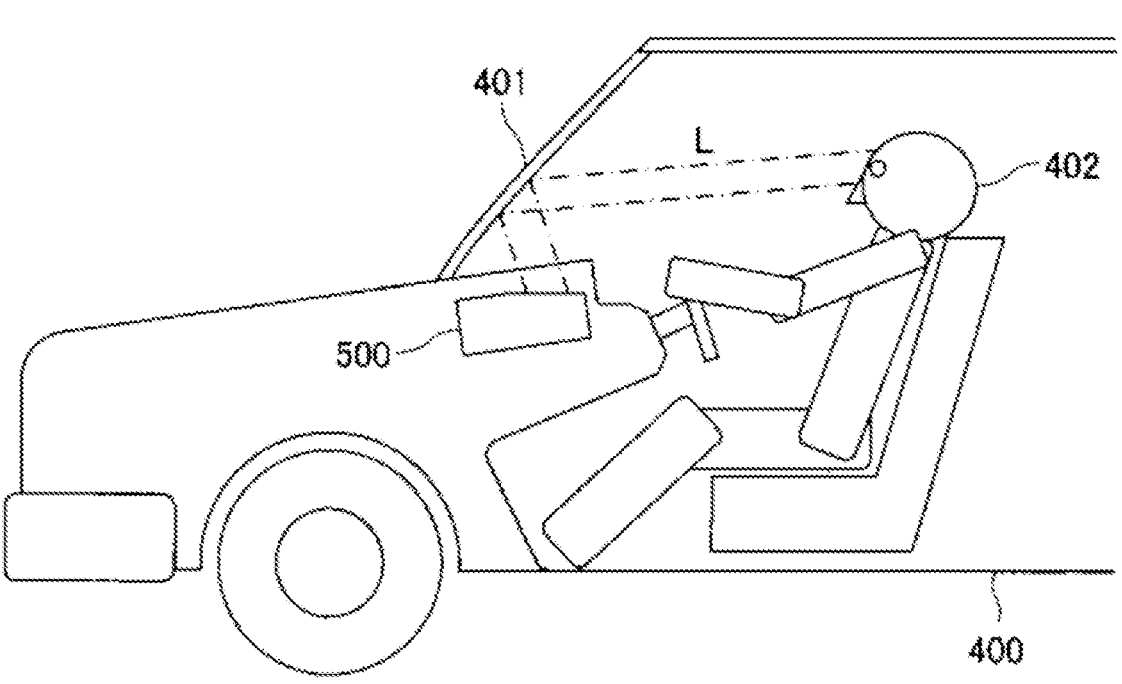
FIG. 26 is a schematic diagram of a vehicle mounted with a head-up display (HUD) according to an embodiment of the present disclosure.

FIG. 26 is a schematic diagram of a vehicle 400 mounted with a head-up display (HUD) 500 that serves as an image projection apparatus according to an embodiment of the present disclosure. FIG. 27 is a schematic diagram of the HUD 500 according to an embodiment of the present disclosure.

The image projection apparatus uses optical scanning to project images. The image projection apparatus is, for example, a HUD.

As illustrated in FIG. 26, the HUD 500 is disposed, for example, in the vicinity of a front windshield 401 of the vehicle 400. Projection light L that is emitted from the HUD 500 is reflected by the front windshield 401 and directed to a viewer (or a driver 402) as a user. This allows the driver 402 to visually recognize, for example, an image projected by the HUD 500, as a virtual image. Alternatively, a combiner may be disposed on the inner wall surface of the front windshield 401 so that the user can visually recognize a virtual image formed by the projection light that is reflected by the combiner.

Figure 27:
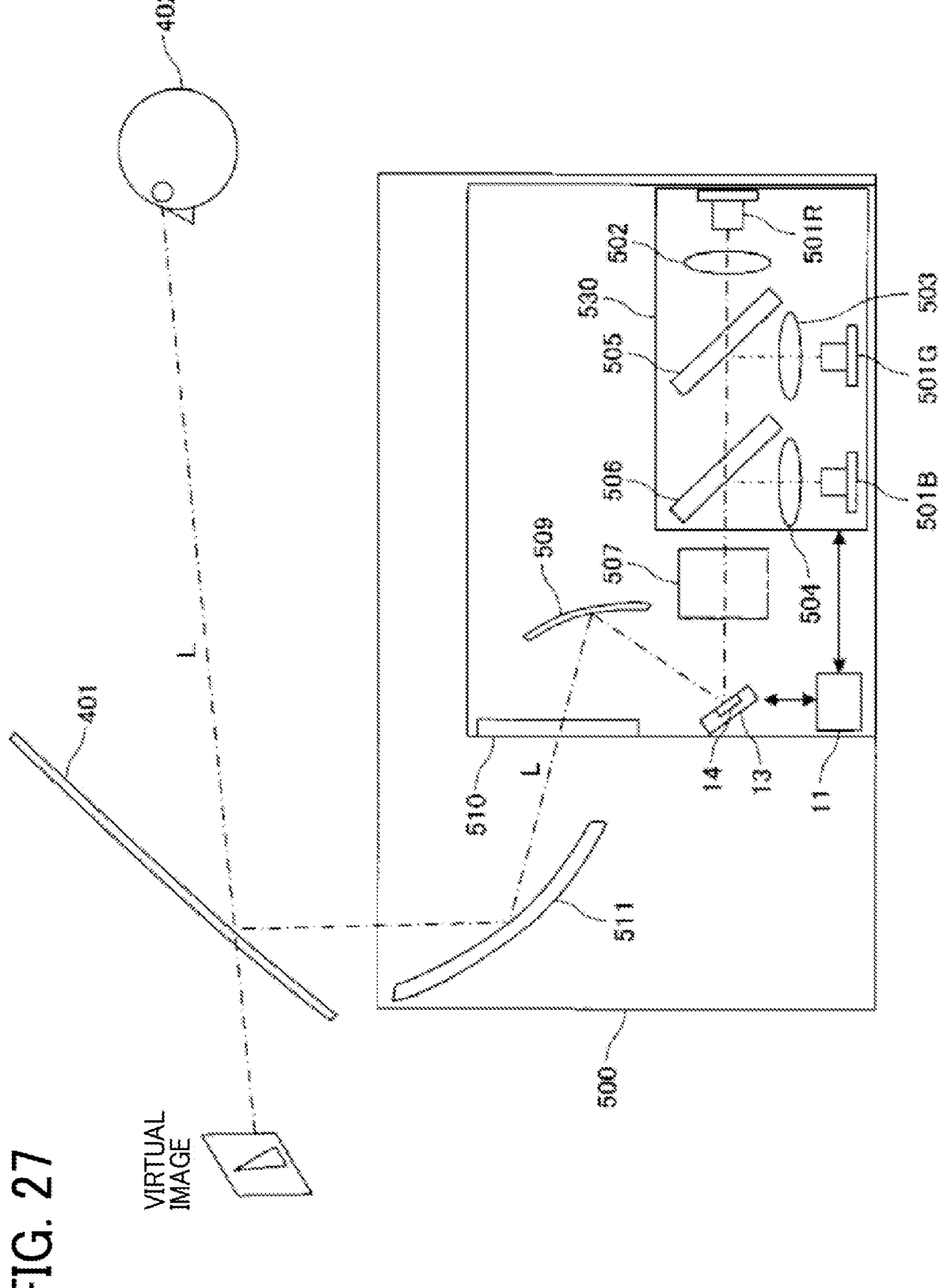
FIG. 27 is a schematic diagram of the HUD in FIG. 26, according to an embodiment of the present disclosure.

As illustrated in FIG. 27, the HUD 500 emits laser beams having different wavelengths from red, green, and blue laser-beam sources 501R, 501G, and 501B (multiple light sources of a light source unit of the HUD 500), respectively. The emitted laser beams pass through an incident optical system, and then are deflected by the movable device 13 having the reflecting surface 14. The incidence optical system includes collimator lenses 502, 503, and 504 respectively provided for the laser-beam sources 501R, 501G, and 501B, two dichroic mirrors 505 and 506, and a light-intensity adjuster 507. The deflected laser beams pass through a projection optical system and are projected onto a screen. The projection optical system (an optical system of the image projection apparatus) includes a free-form mirror 509, an intermediate screen 510, and a projection mirror 511. In the HUD 500, the laser-beam sources 501R, 501G, 501B, the collimator lenses 502, 503, 504, and the dichroic mirrors 505, 506 are combined as a single unit that is an optical housing serving as a light source unit 530 (a light source unit of the HUD 500).

The HUD 500 projects an intermediate image displayed on the intermediate screen 510 onto the front windshield 401 of the vehicle 400 to allow the driver 402 to visually recognize the intermediate image as a virtual image.

The laser beams of RGB colors emitted from the laser-beam sources 501R, 501G, and 501B are collimated by the collimator lenses 502, 503, and 504 into substantially parallel beams, and are combined by the two dichroic mirrors 505 and 506. The combined laser beams are two-dimensionally scanned by the movable device 13 having the reflecting surface 14 after having their light intensity adjusted by the light-intensity adjuster 507. The projection light L, which has been two-dimensionally scanned by the movable device 13, is reflected by the free-form mirror 509, corrected for distortion, and then focused onto the intermediate screen 510 to display an intermediate image. The intermediate screen 510 includes a microlens array in which microlenses are two-dimensionally arranged to enlarge the projection light L incident on the intermediate screen 510 in units of microlens.

The movable device 13 reciprocates the reflecting surface 14 in the biaxial direction and two-dimensionally scans the projection light L incident on the reflecting surface 14. The movable device 13 is controlled in synchronization with the light-emitting timing of the laser-beam sources 501R, 501G, and 501B.

In the above-described embodiment, the HUD 500 serves as the image projection apparatus. The image projection apparatus is not limited to the HUD 500 and may be any apparatus that performs optical scanning using the movable device 13 having the reflecting surface 14 to project an image. For example, the present disclosure is also applicable to a projector that is placed on a desk and projects an image onto a display screen, a head-mounted display that is incorporated in a wearable member on, for example, the head of the viewer and that projects an image onto a reflective-and-transmissive screen of the wearable member or on an eyeball as a screen.

The image projection apparatus may be incorporated in, not only the vehicle or the wearable member, but also, for example, a mobile object (e.g., an aircraft, a ship, and a mobile robot) or an immobile body (e.g., an operation robot that operates a driving target object such as a manipulator without moving from the installed location).

The HUD 500 serves as a head-up display. The vehicle 400 serves as a vehicle.

Optical Writing Apparatus

An optical writing apparatus incorporating the movable device 13 according to an embodiment of the present disclosure is described in detail below with reference to FIGS. 28 and 29.

Figure 28:
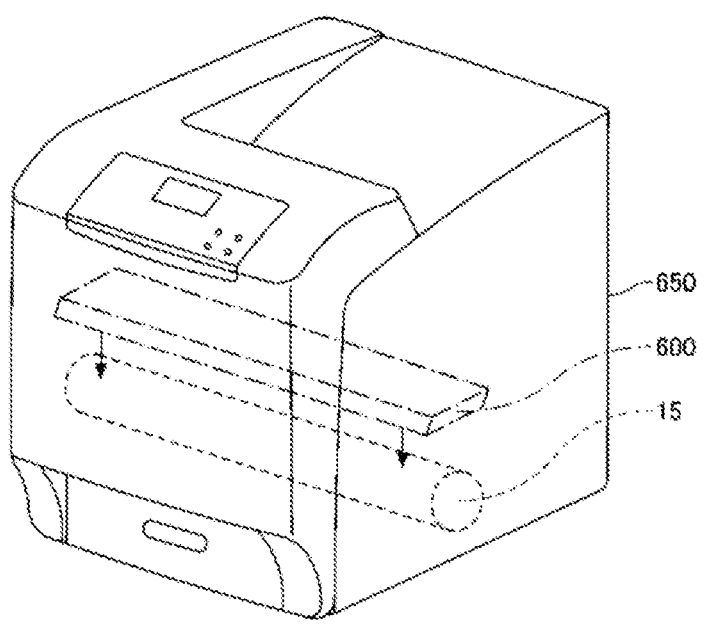
FIG. 28 is a schematic diagram of an image forming apparatus incorporating an optical writing device according to an embodiment of the present disclosure.

FIG. 28 illustrates an image forming apparatus incorporating an optical writing device 600 according to an embodiment of the present disclosure. FIG. 29 is a schematic diagram of the optical writing device 600 according to an embodiment of the present disclosure.

As illustrated in FIG. 28, the optical writing device 600 is used as a component of an image forming apparatus typified by, for example, a laser printer 650 having printing functions using laser beams. In the image forming apparatus, the optical writing device 600 optically scans the photosensitive drum, which is the target surface 15, with one or more laser beams to perform optical writing on the photosensitive drum.

Figure 29:
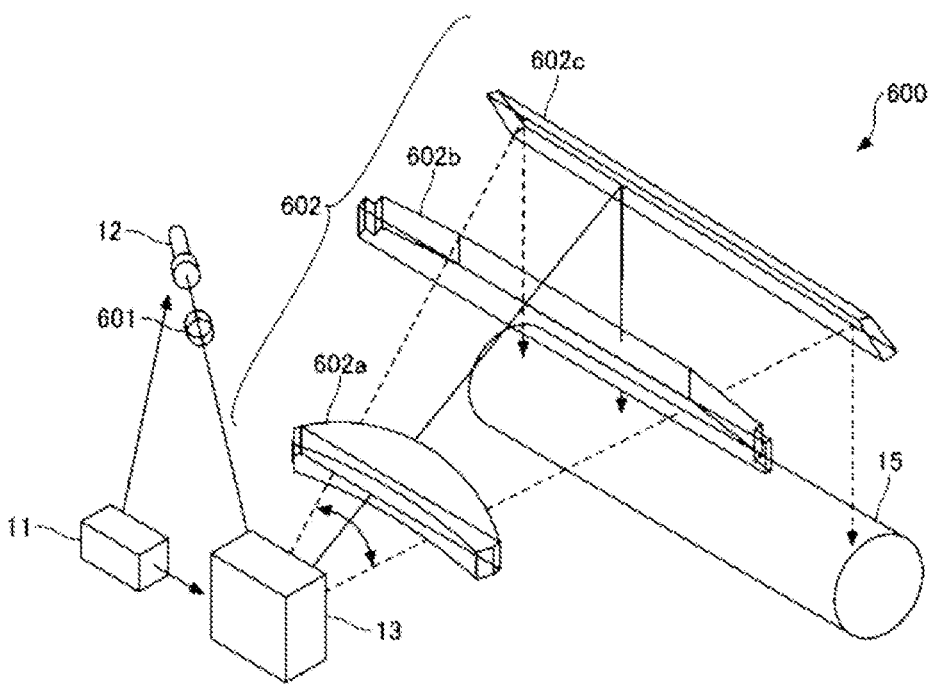
FIG. 29 is a schematic diagram of the optical writing device in FIG. 28, according to an embodiment of the present disclosure.

As illustrated in FIG. 29, in the optical writing device 600, a laser beam from the light-source device 12 (e.g., a laser element) passes through an image-forming optical system 601 (e.g., a collimator lens) and is then deflected uniaxially or biaxially by the movable device 13 having the reflecting surface 14. The laser beam deflected by the movable device 13 then passes through a scanning optical system 602 including a first lens 602a, a second lens 602b, and a reflecting mirror 602c (or a movable portion), and illuminates the target surface 15 (e.g., a photoconductor drum or photosensitive paper) to perform optical writing. The scanning optical system 602 focuses the laser beam into a spot on the target surface 15. The light-source device 12 and the movable device 13 having the reflecting surface 14 are driven based on the control of the control device 11.

The above-described optical writing device 600 can be used as a component of an image forming apparatus that has a printing function using laser beams. Moreover, by employing another scanning optical system to perform scanning in a biaxial manner in addition to the uniaxial manner, the optical writing device 600 can also be used as a component of an image forming apparatus such as a laser label apparatus that deflects laser beams to perform optical scanning on thermal media and print letters by heating.

The movable device 13 having the reflecting surface 14, which is applied to the optical writing device, is advantageous in saving the power of the optical writing device because power consumption for driving the movable device 13 is less than that for driving a rotational polygon mirror. The movable device 13 makes a smaller wind noise during the oscillation than the rotational polygon mirror does. In other words, the movable device 13 is advantageous in achieving lower noise of the optical writing device. The optical writing device involves much smaller installation space than the rotational polygon mirror does, and the movable device 13 generates minimal heat. This facilitates the downsizing of the optical writing device, promoting a compact image forming apparatus.

Object Recognition Apparatus

An object recognition apparatus incorporating the movable device according to an embodiment of the present disclosure is described below in detail with reference to FIGS. 30 and 31.

Figure 30:
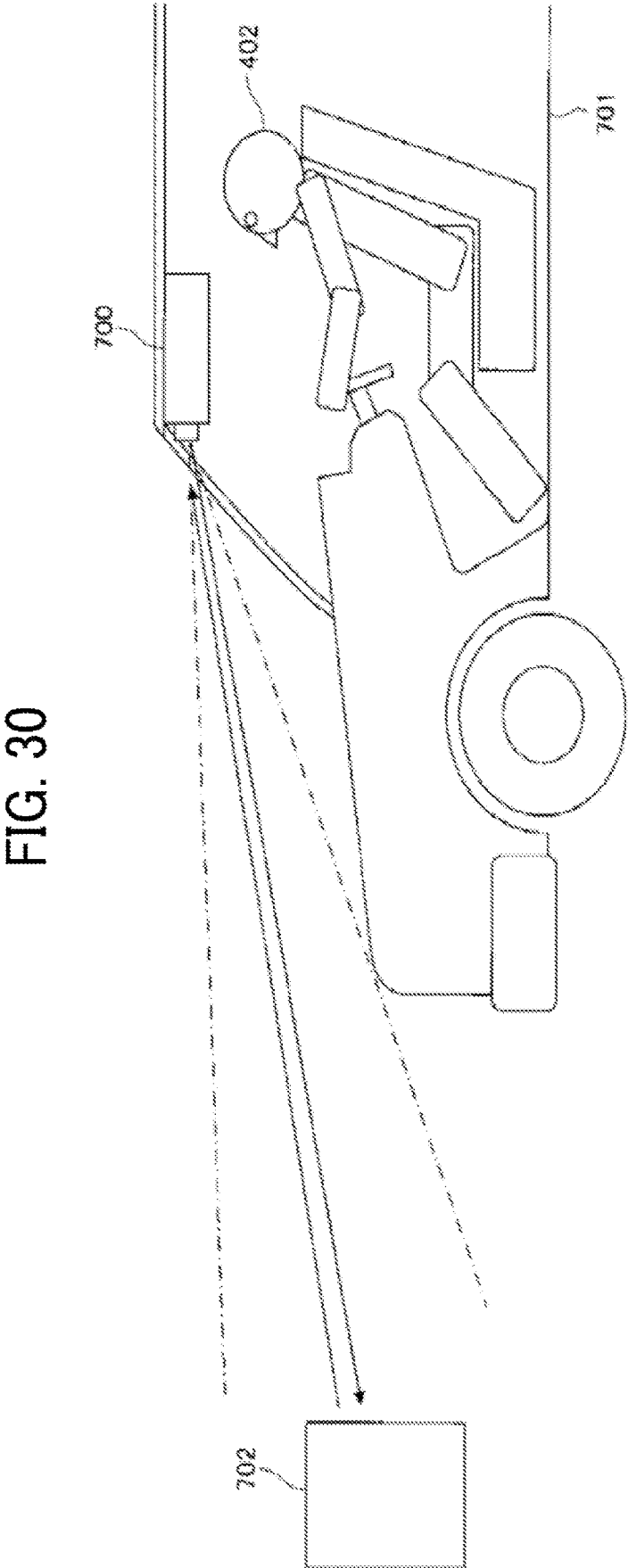
FIG. 30 is a schematic diagram of a vehicle mounted with a laser imaging detection and ranging (LiDAR) device, according to an embodiment of the present disclosure.

FIG. 30 is a schematic diagram of a vehicle mounted with a LiDAR device that serves as an object recognition apparatus according to an embodiment of the present disclosure. FIG. 30 is a schematic diagram of a vehicle mounted with a LiDAR device mounted on a lamp unit that houses a headlamp of the vehicle. FIG. 31 is a schematic diagram of the LiDAR device according to an embodiment of the present disclosure.

The object recognition apparatus recognizes an object in a target direction (i.e., a direction in which the object recognition apparatus is pointed to detect and recognize objects). The object recognition apparatus is, for example, a LiDAR device.

As illustrated in FIG. 30, a LiDAR device 700 is mounted on, for example, a vehicle 701. The LiDAR device 700 performs optical scanning in a target direction and receives light reflected from an object 702 that is present in the target direction. Thus, the LiDAR device 700 recognizes the object 702.

Figure 31:
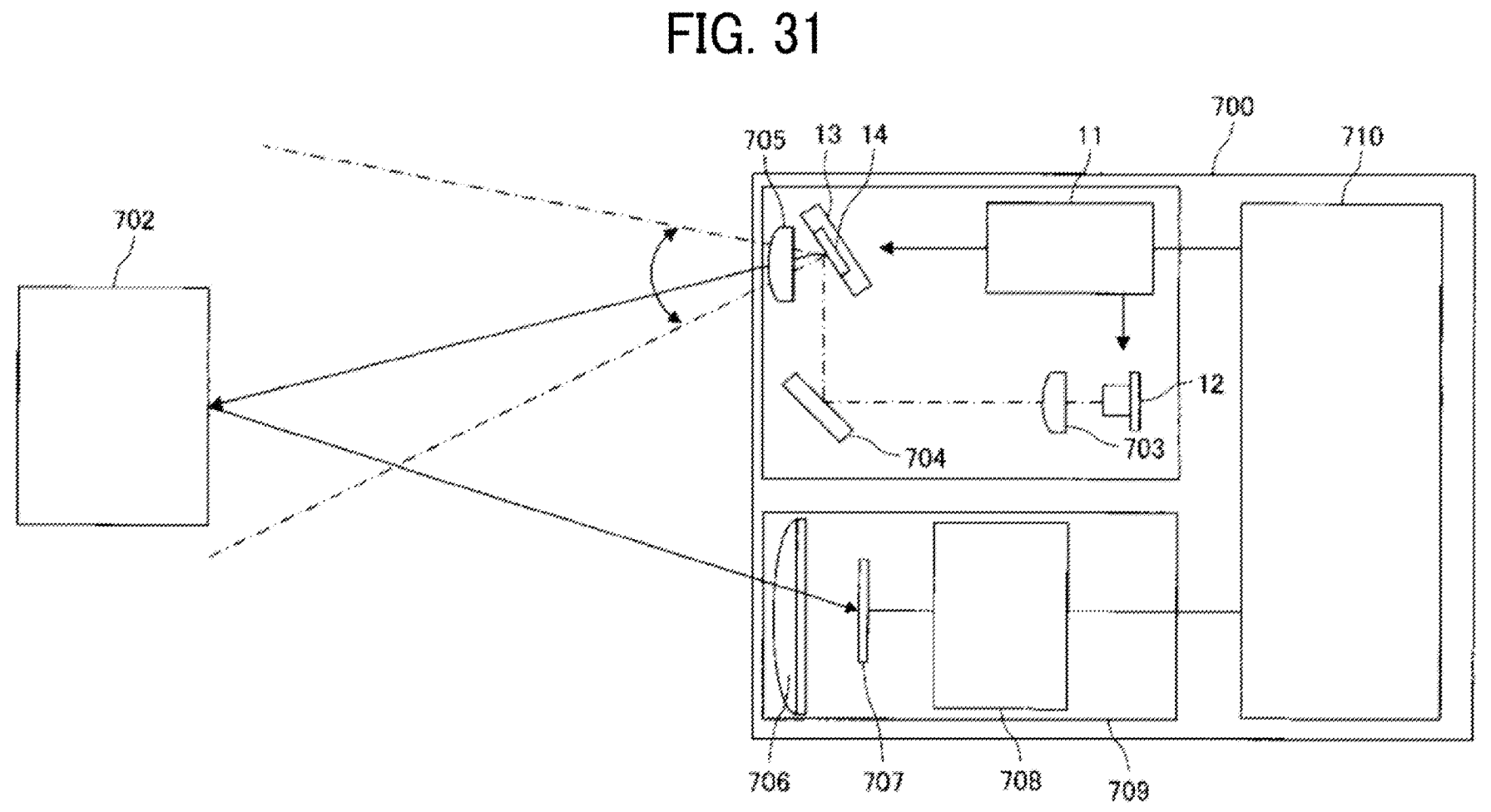

As illustrated in FIG. 31, the laser beams emitted from a light-source device 12 pass through an incidence optical system before being scanned either uniaxially or biaxially by the movable device 13, which has the reflecting surface 14. The incidence optical system includes a collimator lens 703 that serves as an optical system that turns divergent beams into substantially parallel beams, and a planar mirror 704. The parallel beams pass through the projection optical system (i.e., a projector lens 705) and are directed to the object 702 in front of the LiDAR device. The light-source device 12 and the movable device 13 is controlled by the control device 11. The light reflected by the object 702 is detected by a photodetector 709. In other words, the reflected light passes through an incident-light detection optical system, which includes a condenser lens 706, and is received by an imaging element 707. The imaging element 707 then outputs the detected signal to a signal processing circuit 708. The signal processing circuit 708 performs predetermined processing on the received detected signal, such as binarization or noise processing, and outputs the result to a distance measuring circuit 710.

The distance measuring circuit 710 determines whether the object 702 is present based on the time difference between when the light-source device 12 emits laser beams and when the photodetector 709 receives the laser beams, or based on the phase difference for each pixel of the imaging element 707 that has received the laser beams. Additionally, the distance measuring circuit 710 calculates distance information indicating the distance to the object 702.

The movable device 13 having the reflecting surface 14 is more durable and compact than a polygon mirror. As a result, a highly durable and compact LiDAR device can be achieved. Such a LiDAR device can be mounted on, for example, a vehicle, an aircraft, a ship, or a robot. The LiDAR device can optically scan a designated area to detect the presence of an obstacle and determine the distance to the detected obstacle.

In the above embodiment, the LiDAR device 700 serves as the object recognition apparatus. In some embodiments, the object recognition apparatus may be any apparatus that performs optical scanning by controlling the movable device

13 having the reflecting surface 14, using the control device 11. The object recognition apparatus recognizes the object 702 by receiving the reflected laser beam with a photodetector. The above-described embodiment is not exclusive.

The present disclosure is also applicable to, for example, a biometric authentication apparatus, a security sensor, or a component of a three-dimensional scanner. The biometric authentication apparatus scans a hand or face to obtain distance data, derives attributes (e.g., shape) from the obtained distance data, and uses records for object recognition. The security sensor scans a target range to identify an incoming object. The three-dimensional scanner obtains distance data through scanning, determines related attributes (e.g., shape), and outputs the results as three-dimensional data.

Laser Headlamp

Figure 32:
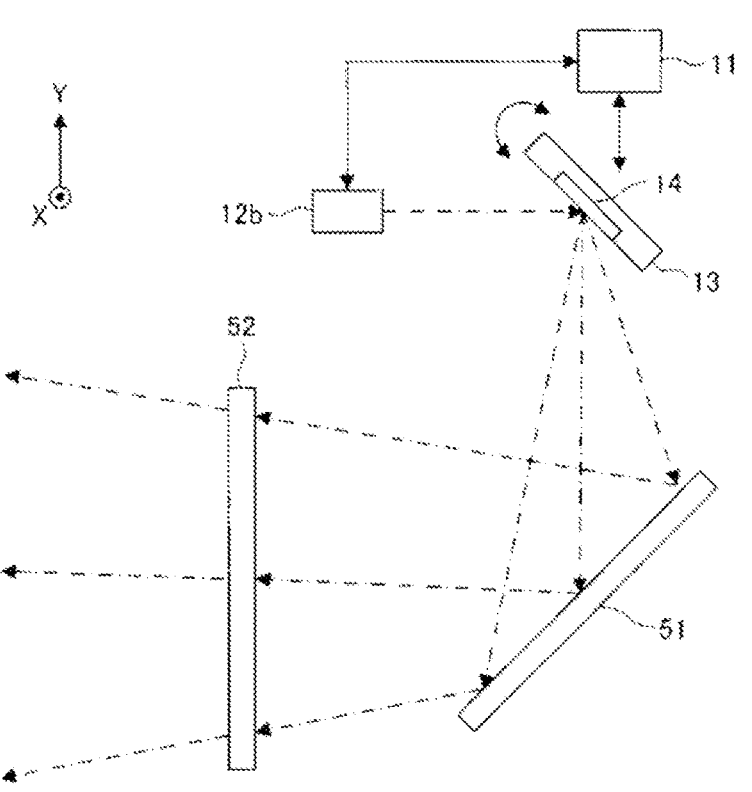
FIG. 32 is a schematic diagram of a laser headlamp according to an embodiment of the present disclosure.

A laser headlamp 50 in which the movable device of the embodiment is applied to a headlight of a vehicle is described below with reference to FIG. 32. FIG. 32 is a schematic diagram of the laser headlamp 50 according to an embodiment of the present disclosure.

The laser headlamp 50 includes a control device 11, a light-source device 12b, a movable device 13 including a reflecting surface 14, a mirror 51, and a transparent plate 52.

The light-source device 12b is a light source that emits blue laser beams. The laser beams emitted from the light-source device 12b are incident on the movable device 13 and are reflected by the reflecting surface 14. The movable device 13 moves the reflecting surface 14 in the XY-direction based on the signal from the control device 11. The movable device 13 then two-dimensionally scans the blue laser beams emitted from the light-source device 12b in the XY-direction.

The scanning light of the movable device 13 reflects off the mirror 51 and enters the transparent plate 52. The transparent plate 52 has either its front or back surface coated with a yellow phosphor. The blue laser beams reflected by the mirror 51 turn into white light, which falls within the legally prescribed color range for headlights when passing through the yellow phosphor coating on the transparent plate 52. As a result, the front of the vehicle is illuminated by white light from the transparent plate 52.

The scanning light of the movable device 13 scatters in a predetermined manner upon passing through the fluorescent material of the transparent plate 52. This reduces the glare on target objects illuminated in the area in front of the vehicle.

When the movable device 13 is applied to a headlight of a vehicle, neither the color of the light beams from the light-source device 12b nor the phosphor is restricted to blue and yellow, respectively. For example, the light-source device 12b may emit near-ultraviolet light, and the transparent plate 52 may be coated with a homogenized mixture of fluorescent materials of red, green, and blue (RGB) trichromatic colors. In this case as well, the light passing through the transparent plate 52 can be converted into white, allowing the front of the vehicle to be illuminated with white light.

Head-Mounted Display

Figure 33:
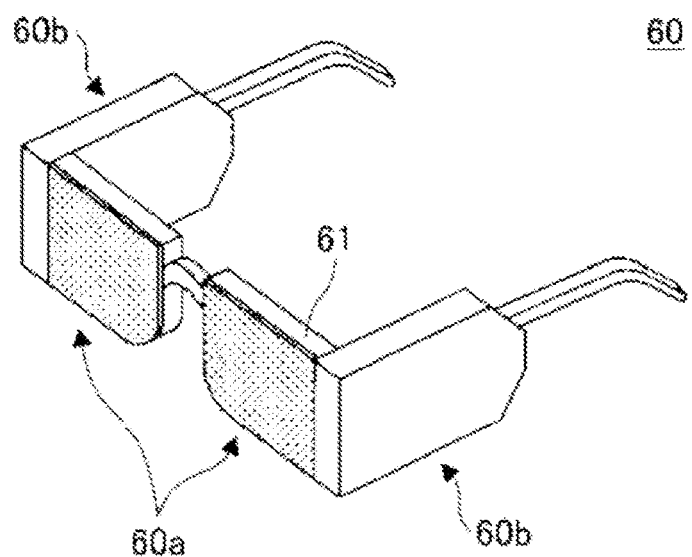
FIG. 33 is a schematic perspective view of a head-mounted display according to an embodiment of the present disclosure.
Figure 34:
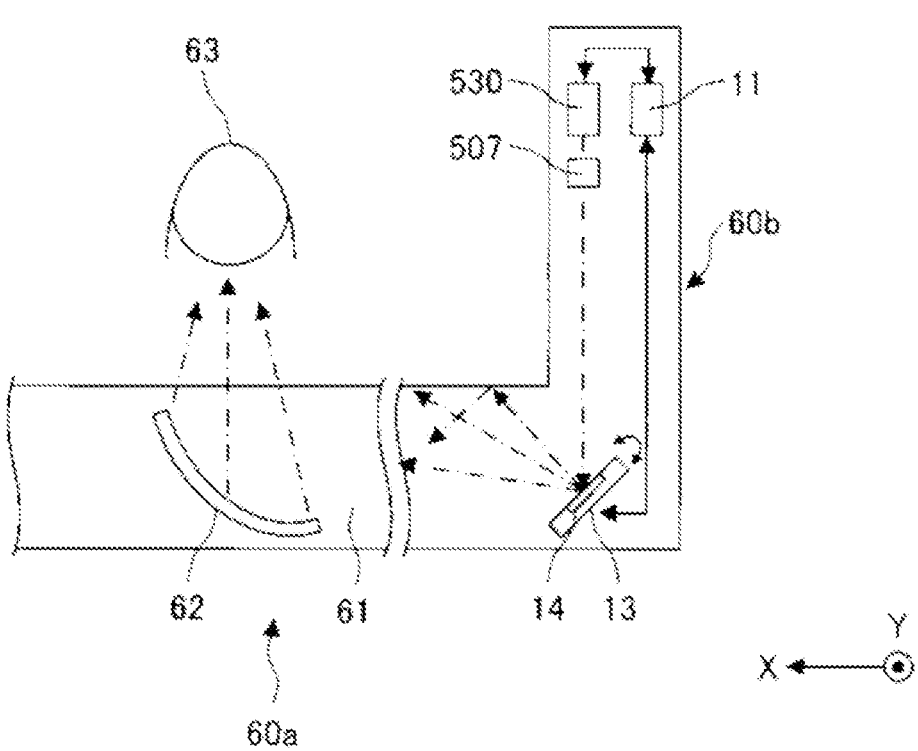
FIG. 34 is a diagram of the head-mounted display in FIG. 33, according to an embodiment of the present disclosure.

A head-mounted display 60 incorporating a movable device according to the embodiments of the present disclosure is described referring to FIGS. 33 and 34. The head-mounted display 60 can be worn on a human head and can be designed to resemble, for example, glasses. In the following description, such a head-mounted display is referred to simply as an HMD (i.e., the HUD 60).

FIG. 33 is a perspective view of the appearance of the HMD 60 according to an embodiment of the present disclosure. In FIG. 33, the HMD 60 includes a front 60*a* and a temple 60*b*, arranged approximately symmetrically on both the left and right sides. The front 60*a* may include, for example, a light guide plate 61. The optical system, controller, and other components may be housed within the temple 60*b*.

FIG. 34 is a diagram of a part of the HMD 60 according to an embodiment of the present disclosure. Although the configuration for the left eye is illustrated in FIG. 34, the HMD 60 has a configuration similar to that for the right eye.

The HMD 60 includes a control device 11, a light source unit 530, a light-intensity adjuster 507, a movable device 13 having a reflecting surface 14, a light guide plate 61, and a semi-reflective mirror 62.

The light source unit 530 includes, as described above, the laser-beam sources 501R, 501G, and 501B, the collimator lenses 502, 503, and 504, and the dichroic mirrors 505 and 506, and these elements are combined as a single unit in the optical housing. In the light source unit 530, the laser beams of the RGB colors that are emitted from the laser-beam sources 501R, 501G, and 501B are combined by the two dichroic mirrors 505 and 506. The combined parallel light is emitted from the light source unit 530.

The light from the light source unit 530 undergoes intensity adjustment by the light-intensity adjuster 507 before being directed to the movable device 13. Based on the signal from the control device 11, the movable device 13 moves the reflecting surface 14 in the XY-direction and conducts a two-dimensional scan using the light emitted from the light source unit 530. The driving of the movable device 13 is driven in synchronization with the light emission timings of the laser-beam sources 501R, 501G, and 501B, forming a color image with the scanning light.

The scanning light of the movable device 13 is incident on the light guide plate 61. The light guide plate 61 reflects the scanning light off its inner wall, guiding the scanning light to the semi-reflective mirror 62. The light guide plate 61 contains, for example, resin, which is transparent to the wavelength of the scanning light.

The semi-reflective mirror 62 reflects the light from the light guide plate 61 to the rear side of the HMD 60, directing the light toward the eye of a wearer 63 of the HMD 60. The semi-reflective mirror 62 has, for example, a free-form surface shape. The image formed by the scanning light is reflected by the semi-reflective mirror 62 and projected onto the retina of the wearer 63. The image of the scanning light is projected onto the retina of the wearer 63 due to the reflection from the semi-reflective mirror 62 and the effect of the crystalline lens of the eyeball. Moreover, due to the reflection from the semi-reflective mirror 62, spatial distortion of the image is corrected. The wearer 63 can observe the image formed by the light scanned in the XY-direction.

Due to the semi-reflective mirror 62, the wearer 63 observes an image formed by external light superposed on the image formed by the scanning light. By replacing the semi-reflective mirror 62 with a full mirror, external light can be excluded, allowing only the image formed by the scanning light to be observed.

Eyeball-Tilt Position Detector (Pupil or Cornea Position Detection Apparatus)

An eyeball-tilt position detector incorporating the above movable device is described below according to an embodiment of the present disclosure. The eyeball-tilt position according to an embodiment of the present disclosure refers to the position of the pupil or cornea of the eyeball, or the user's eye-gaze direction. In the following description, the eyeball-tilt position is referred to as the position of the pupil or cornea, and the eyeball-tilt position detector is referred to as the pupil or cornea position detection device. The pupil or cornea position detection device described below is synonymous with an eye-gaze direction tracking device (or an eye tracking device) that detects or tracks the user's gaze direction continuously or at set time intervals.

Figure 35:
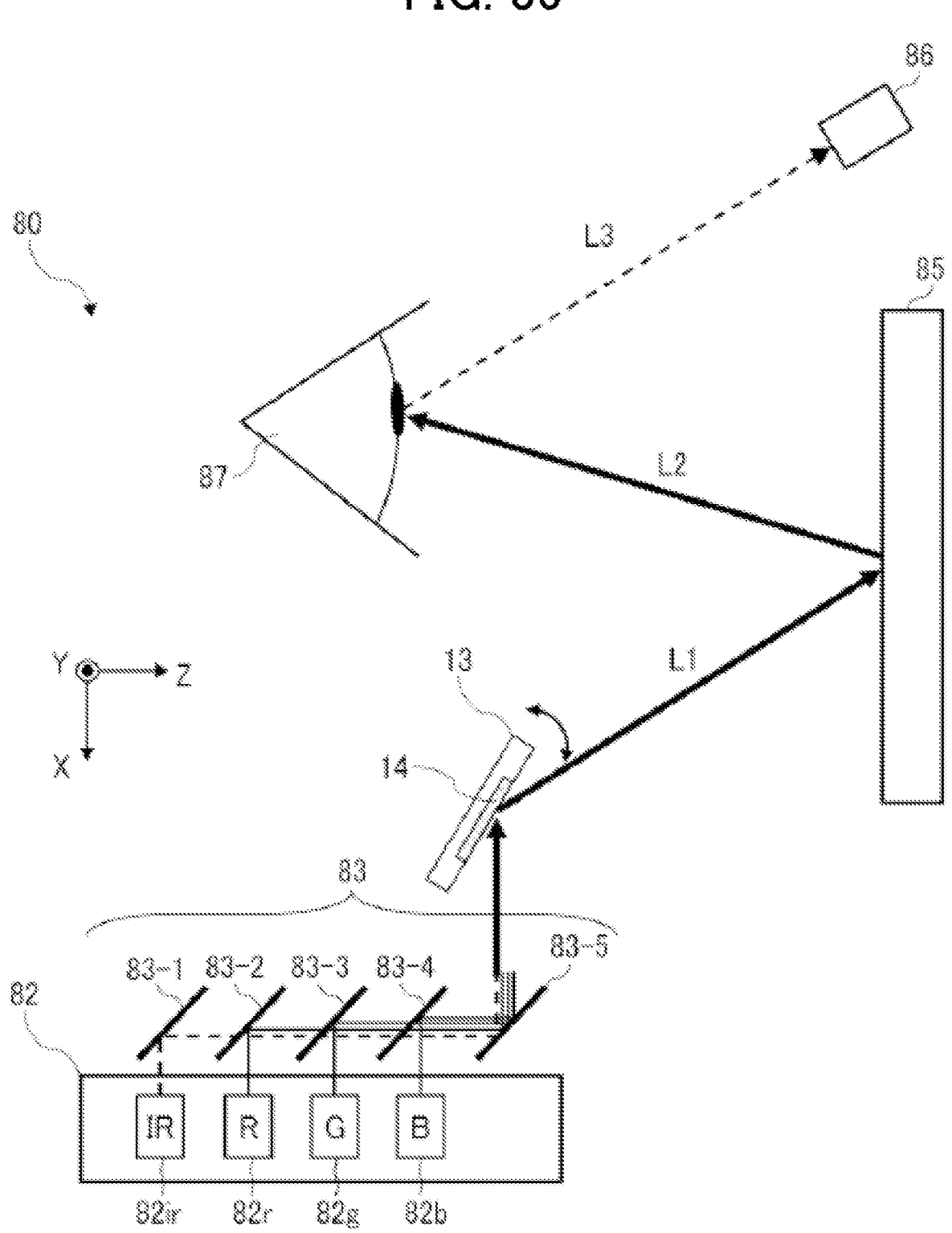
FIG. 35 is a schematic diagram of a pupil or cornea position detection apparatus having an image display function.

FIG. 35 is a schematic diagram of a pupil or cornea position detection apparatus 80 having an image display function. Arrows illustrated in FIG. 35 indicate an X-direction, a Y-direction, and a Z-direction. FIG. 35 is a perspective view of the pupil or cornea position detecting apparatus 80 as seen from above (i.e., in the +Y-direction). The pupil or cornea position detection apparatus 80 illustrated in FIG. 35 includes a light source 82, a first optical deflector 83, a movable device 13, a second optical deflector 85, and a light receiver 86.

The light source 82 includes, for example, laser sources 82*r*, 82*g*, and 82*b* and an infrared laser source 82*ir*. The laser sources 82*r*, 82*g*, and 82*b* emit a red laser beam, a green laser beam, and a blue laser beam, respectively. The infrared laser source 82*ir* emits an infrared laser beam. The laser sources 82*r*, 82*g*, and 82*b* may be any combination of one or two thereof to emit light for drawing an image by the movable device 13.

The infrared laser source 82*ir* emits light for detecting the pupil or the cornea position. The light for detecting the pupil or cornea position is not limited to infrared light and may be visible light. However, invisible light is more desirable to enhance the clarity or viewability of the drawn image.

The first optical deflector 83 is, for example, a dichroic mirror that combines and deflects the light beams emitted from the light source 82 toward the reflecting surface 14 of the movable device 13. The first optical deflector 83 may be multiple first light deflectors, depending on the number of laser sources 82*r*, 82*g*, and 82*b* and infrared laser source 82*ir* included in the light source 82. In the present embodiment described with reference to FIG. 35, the first optical deflector 83 combines and deflects the light beams using the first optical deflectors 83-1, 83-2, 83-3, 83-4, and 83-5.

The movable device 13 is any one of the movable devices according to the first embodiment or the second embodiment of the present disclosure. The movable device 13, which includes a reflecting surface 14, two-dimensionally scans (or moves) the light deflected by the first optical deflector 83 toward the second optical deflector 85. At this time, the movable device 13 scans the light deflected by the first optical deflector 83, for example, through raster scanning and forms an image. In FIG. 35, one movable device 13 is used. In some embodiments, two or more movable devices 13 may be used.

The second optical deflector 85 is, for example, a holographic optical device and deflects light L1 scanned by the movable device 13 toward an eyeball 87 of the user. At least a part of light L2 deflected by the second optical deflector 85 impinges on the eyeball 87 of the user as display image light. In some embodiments, the second optical deflector 85 includes multiple optical deflection elements. For example, multiple types of optical deflection elements are used to reflect the laser beams emitted from the light source 82, respectively. In other words, different reflecting surfaces of the optical deflection elements correspond to the laser beams emitted from the light source 82. More specifically, first to third optical deflection elements are used to reflect the laser beams emitted from the laser sources 82*r*. 82*g*, and 82*b*, respectively. Additionally, a fourth optical deflection element is used to reflect a laser beam emitted from the infrared laser source 82*ir*. The first to fourth optical deflection elements are laminated in order of proximity to the eyeball 87.

Figure 36:
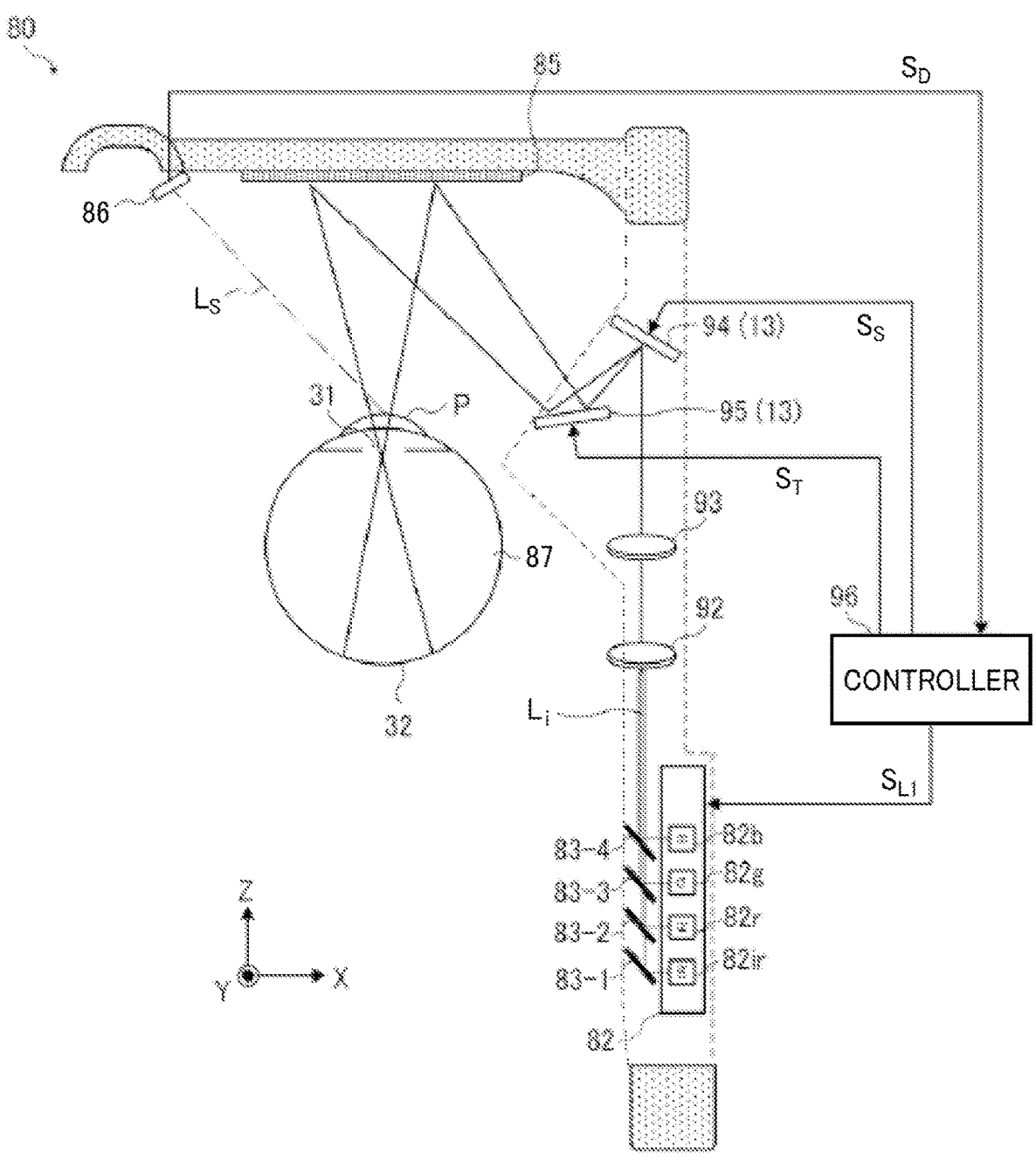
FIG. 36 is a diagram of a head-mounted display incorporating the pupil or cornea position detection apparatus in FIG. 35, according to an embodiment of the present disclosure.

The light receiver 86 receives light L3 reflected by the eyeball 87 of the user from the light L2 deflected by the second optical deflector 85 and outputs a detection signal SD corresponding to the received light (refer to FIG. 36). The light receiver 86 is, for example, an imaging element that can detect infrared rays. In some embodiments, multiple light receivers 86 are placed at positions to detect light rays (i.e., the light L3) reflected by the eyeball 87 of the user. The intensity of the light received by the light receiver 86 changes with the position of the eyeball (e.g., a pupil and a cornea), i.e., with the eye-gaze direction. Given the above, the pupil or cornea position detection apparatus 80 according to an embodiment of the present disclosure detects or estimates the position of the pupil or cornea based on the intensity of light received by the light receiver 86. The light receiver 86 may be configured to capture an image of the eyeball 87 irradiated with the light L2 deflected by the second optical deflector 85. In this configuration, the pupil or cornea position detection apparatus 80 detects or estimates the eyeball-tilt position based on the position of the pupil or cornea within the captured image (i.e., the detection signal SD) and the point on the eyeball 87 at which the light L2 deflected by the second optical deflector 85 reflects off.

As described above, the pupil or cornea position detection apparatus 80 according to an embodiment of the present disclosure can detect the position of the pupil or cornea while forming an image with the movable device 13. The movable device 13, due to its configuration that allows for more effective light scanning, enables image formation and the detection of the pupil or cornea position with lower power consumption.

The pupil or cornea position detection apparatus 80 may be mounted on a head-mounted display, for example, as an eye-gaze direction tracking (eye tracking) device to detect or track the eye-gaze direction of the user. In this configuration, for example, by lowering the resolution of images displayed in areas other than the area near the eye-gaze direction of the user (i.e., foveated rendering), a higher speed of image processing can be achieved than when displaying high-resolution images across the entire area.

FIG. 36 is a diagram of a head-mount display incorporating the pupil or cornea position detection apparatus in FIG. 35 according to an embodiment of the present disclosure. The pupil or cornea position detection apparatus 80 illustrated in FIG. 36 includes the light source 82, the first optical deflectors 83-1 to 83-4, a lens 92, a lens 93, a scanning mirror 94, a deflection mirror 95, a second optical deflector 85, a light receiver 86, and a controller 96. As the light source 82, the first optical deflector 83-1 to 83-4, the second optical deflector 85, and the light receiver 86 have similar configurations to those described with reference to FIG. 35, and thus overlapping features may be omitted. The lens 92 is an optical system that converts the light emitted from the light source 82 into substantially parallel light rays. The lens 93 is an optical system that shapes the light, which has been converted into substantially parallel light rays by the lens 92, into a desired laser beam profile. In the present embodiment, both the lens 92 and the lens 93 are used. However, in some embodiments, the lens 92 and the lens 93 are not used.

The light formed by the lens 92 and the lens 93 is incident on the scanning mirror 94 (i.e., movable device 13). The scanning mirror 94 scans the incident light to form image light. The formed image light is incident on the deflection mirror 95 and is reflected in a direction toward the second optical deflector 85. The deflection mirror 95 corresponds to a first optical deflector 83-5 described with reference to FIG. 35, and preferably has a configuration that includes the movable device 13 to deflect light. The deflection mirror 95 that performs optical scanning allows for a broader image projection.

In FIG. 36, the deflection mirror 95 is disposed between the scanning mirror 94 and the second optical deflector 85. However, no limitation is intended thereby. In some embodiments, the scanning mirror 94 is disposed between the deflection mirror 95 and the second optical deflector 85. The scanning mirror 94 scans light reflected by the deflection mirror 95 in the biaxial directions and directs the light to the second optical deflector 85.

The controller 96 detects the position of the pupil or the cornea of the user based on the detection signal SD output from the light receiver 86 and acquires information indicating the eye-gaze direction. To form an image projected onto a retina 32, the controller 96 controls the emission and light intensity of the light source 82 by supplying a driving signal SL1 for formation to light source 82, and also drives the scanning mirror 94 by supplying a driving signal SS for scanning to the scanning mirror 94. In addition, for the deflection mirror 95 that optically scans, the controller 96 drives the deflection mirror 95 by supplying a driving signal ST for deflection to the deflection mirror 95, so as to control the projection position of the image based on the acquired information on the eye-gaze direction.

Aspects of the present disclosure are as follows.

Aspect 1

A movable device includes a movable portion; a driver connected to the movable portion to drive the movable portion; a reflector having a reflecting surface that reflects light; a connector that connects the movable portion and the reflector in a direction intersecting the reflecting surface; and a reinforcement extending from at least one of the reflector toward the movable portion, or the movable portion toward the reflector In this configuration, the reinforcement prevents the deformation of the movable portion or the reflector, reducing or preventing stress concentration at the joint surface between the connector and the reflector or the movable portion. This results in a more robust connector. This further achieves a movable device that can stably rotate, with a strong and firm joint surface.

Aspect 2

In the movable device according to Aspect 1, the reinforcement has a surface extending in a vertical direction relative to a joint surface between the connector and the movable portion or the reflector.

In this configuration, the vertical surface relative to the vector directions of the shear stress, which generates sliding phenomena at the joint surface where stress is most concentrated in the connector, serves as counteracting forces. This results in a robust connector and a stable and robust movable device.

Aspect 3

In the movable device according to Aspect 1 or 2, at least one of the connector or the reinforcement surrounds the other.

This enables comprehensive prevention of shear stress in all 360-degree vector directions at the joint surface where stress is most concentrated.

Aspect 4

In the movable device according to any one of Aspects 1 to 3, the reinforcement includes: a solid-cylindrical reinforcement and a hollow-cylindrical reinforcement that surrounds the solid-cylindrical reinforcement. The connection surrounds the solid-cylindrical reinforcement and is surrounded by the hollow-cylindrical reinforcement.

This configuration allows the connector to be uniformly reinforced in all 360-degree directions, from both the inner and outer side surfaces. This results in a stronger and more robust connector, achieving a movable device that can stably rotate.

Aspect 5

In the movable device according to any one of Aspects 1 to 4, the connector is bonded to the movable portion or the reflector with an adhesive. The reinforcement extends from an area with the adhesive on the movable portion or the reflector.

This configuration allows the reinforcement to reinforce an area encompassing the joint surface. This results in a much stronger connector and achieves a movable device that can stably rotate.

Aspect 6

In the movable device according to any one of Aspects 1 to 5, the adhesive is between the connector and the reinforcement.

Thus, the inertial force due to the impact is counteracted by the resistive forces of the reinforcement that is located substantially parallel to the side surface of the connector. This effectively reduces the shear stress applied to the joint surface. In particular, reducing or preventing those forces at the end of the side surface of the connector closest to the joint surface is effective in reducing the shear stress. This configuration further enables a constant distance between the connector and the reinforcement, reducing the shear stress applied onto the joint surface. Additionally, this configuration also prevents the connector and the reinforcement from colliding with each other and potentially damaging each other during the rotation of the reflector.

Aspect 7

In the movable device according to Aspect 6, the adhesive is between a first joint surface of the connector and a second joint surface of the movable portion or the reflector. The connector does not contact the reinforcement.

This configuration reduces the risk of damage such as cracking under impacts that occur with rigid interfaces, e.g., metal joints, by utilizing an elastic resin for bonding. The connector, movable portion, reflector, and reinforcement are formed by silicon or silicon oxide and have high hardness. The components may collide with each other due to an external impact. Such collision can be prevented by keeping the components separate and avoiding any contact therebetween.

Aspect 8

The movable device according to any one of Aspects 1 to 7, further includes multiple connectors including the connector. This configuration enhances the strength of the connector, achieving a robust and stable movable device.

Aspect 9

In the movable device according to any one of Aspects 1 to 8, the driver has a meander structure. With this configuration, the meandering structure prevents ringing and also mitigates the high-frequency stimulation on the joint surface caused by linking, achieving a movable device that remains stable over the long term.

Aspect 10

A movable device includes: a support; a movable portion inside the support and connected to the support; a driver, on a face of the support, to drive the movable portion; a reflector having a reflecting surface to reflect light; a connector connecting the movable portion and the reflector in a connection direction intersecting the face of the support portion; and a reinforcement having at least one of: an extension portion from the reflector toward the movable portion, or another extension portion from the movable portion toward the reflector.

Aspect 11

In the movable device according to Aspect 10, the reflector has a first joint portion having a first joint face connected to one end of the connector. The movable portion has a second joint portion having a second joint face connected to another end of the connector. The reinforcement has a side face extending in a direction orthogonal to at least one of the first joint surface or the second joint face.

Aspect 12

In the movable device according to Aspect 10 or 11, the reinforcement surrounds the connector.

Aspect 13

In the movable device according to Aspect 10 or 11, the connector surrounds the reinforcement.

Aspect 14

In the movable device according to any one of Aspects 10 to 13, the reinforcement includes: a first reinforcement having a solid cylindrical shape; and a second reinforcement having a hollow cylindrical shape surrounding the first reinforcement. The connector is between the first reinforcement and the second reinforcement. The connector surrounds the first reinforcement and is surrounded by the second reinforcement.

Aspect 15

The movable device according to any one of Aspects 10 to 14, further has an adhesive bonding the connector to a bonding face of at least one of the movable portion or the reflector. The reinforcement extends from the bonding face in a direction orthogonal to the bonding face.

Aspect 16

In the movable device according to any one of Aspects 10 to 15, the adhesive bonds a side face of the connector and a side face of the reinforcement.

Aspect 17

In the movable device according to Aspect 16, the reflector has a first joint portion having a first joint face connected to one end of the connector. The movable portion has a second joint portion having a second joint face connected to another end of the connector. The connector is separated from the reinforcement in a direction orthogonal to the connection direction. The adhesive further bonds the connector to at least one of: the first joint face of the reflector; or the second joint face of the movable portion.

Aspect 18

The movable device according to any one of Aspects 10 to 17, further includes multiple connectors including the connector.

Aspect 19

In the movable device according to any one of Aspects 10 to 18, the driver has a meander structure.

Aspect 20

In the movable device according to Aspects 10 to 19, the driver includes: a first driver to rotate the movable portion about a first axis; and a second driver to rotate the movable portion about a second axis intersecting the first axis.

Aspect 21

An optical scanning system including the movable device according to any one of Aspects 11 to 20.

Aspect 22

A head-mounted display includes the movable device according to any one of Aspects 11 to 19.

Aspect 23

A head-up display includes the movable device according to any one of Aspects 11 to 20.

Aspect 24

A laser headlamp includes the movable device according to any one of Aspects 11 to 20.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A movable device comprising:
a movable portion;
a driver connected to the movable portion, the driver to drive the movable portion;
a reflector having a reflecting surface to reflect light;
a connector connecting the movable portion and the reflector in a connection direction intersecting the reflecting surface; and
a reinforcement having at least one of:
an extension portion from the reflector toward the movable portion, or
another extension portion from the movable portion toward the reflector,
wherein the reflector has a first joint portion having a first joint face connected to one end of the connector,
the movable portion has a second joint portion having a second joint face connected to another end of the connector, and
the reinforcement has a side face extending in a direction orthogonal to at least one of the first joint surface or the second joint face.

2. The movable device according to claim 1,
wherein the reinforcement surrounds the connector.

3. The movable device according to claim 1,
wherein the reinforcement includes:
a first reinforcement having a solid cylindrical shape; and
a second reinforcement having a hollow cylindrical shape surrounding the first reinforcement,
the connector is between the first reinforcement and the second reinforcement, and
the connector surrounds the first reinforcement and is surrounded by the second reinforcement.

4. The movable device according to claim 1, further has an adhesive bonding the connector to a bonding face of at least one of the movable portion or the reflector,
wherein the reinforcement extends from the bonding face in a direction orthogonal to the bonding face.

5. The movable device according to claim 4,
wherein the adhesive bonds a side face of the connector and a side face of the reinforcement.

6. The movable device according to claim 5,
wherein the reflector has a first joint portion having a first joint face connected to one end of the connector,
the movable portion has a second joint portion having a second joint face connected to another end of the connector, and
the connector is separated from the reinforcement in a direction orthogonal to the connection direction, and
the adhesive further bonds the connector to at least one of:
the first joint face of the reflector; or
the second joint face of the movable portion.

7. The movable device according to claim 1, further comprising multiple connectors including the connector.

8. The movable device according to claim 1,
wherein the driver has a meander structure.

9. The movable device according to claim 1,
wherein the driver includes:
a first driver to rotate the movable portion about a first axis; and
a second driver to rotate the movable portion about a second axis intersecting the first axis.

10. An optical scanning system comprising the movable device according to claim 1.

11. A head-mounted display comprising the movable device according to claim 1.

12. A head-up display comprising the movable device according to claim 1.

13. A laser headlamp comprising the movable device according claim 1.

14. An object recognition apparatus comprising the movable device according to claim 1 to recognize an object.

15. A mobile object comprising the head-up display according to claim 12.

16. A mobile object comprising the laser headlamp according to claim 13.

17. A mobile object comprising the object recognition apparatus according to claim 14.

18. A position detection apparatus comprising the movable device according to claim 1 to detect a position of pupil or cornea.

19. A movable device comprising:
a movable portion;
a driver connected to the movable portion, the driver to drive the movable portion;
a reflector having a reflecting surface to reflect light;
a connector connecting the movable portion and the reflector in a connection direction intersecting the reflecting surface; and
a reinforcement having at least one of:
an extension portion from the reflector toward the movable portion, or
another extension portion from the movable portion toward the reflector,
wherein the reinforcement includes:
a first reinforcement having a solid cylindrical shape; and
a second reinforcement having a hollow cylindrical shape surrounding the first reinforcement,
the connector is between the first reinforcement and the second reinforcement, and
the connector surrounds the first reinforcement and is surrounded by the second reinforcement.

20. A movable device comprising:
a movable portion;
a driver connected to the movable portion, the driver to drive the movable portion;
a reflector having a reflecting surface to reflect light;
a connector connecting the movable portion and the reflector in a connection direction intersecting the reflecting surface;
a reinforcement having at least one of:
an extension portion from the reflector toward the movable portion, or
another extension portion from the movable portion toward the reflector; and
an adhesive bonding the connector to a bonding face of at least one of the movable portion or the reflector,
wherein the reinforcement extends from the bonding face in a direction orthogonal to the bonding face, wherein the adhesive bonds a side face of the connector and a side face of the reinforcement, and wherein the reflector has a first joint portion having a first joint face connected to one end of the connector, the movable portion has a second joint portion having a second joint face connected to another end of the connector, and the connector is separated from the reinforcement in a direction orthogonal to the connection direction, and the adhesive further bonds the connector to at least one of:

the first joint face of the reflector; or the second joint face of the movable portion.

* * * * *